United States Patent [19]
Sasaki et al.
[11] 4,268,596
[45] May 19, 1981

[54] ELECTROPHOTOGRAPHIC ELEMENT HAVING 1,4-BIS(AZOSTYRYL)-2,5 DIMETHOXY BENZENE COMPOUNDS AS PHOTOCONDUCTORS

[75] Inventors: Masaomi Sasaki, Shizuoka; Mitsuru Hashimoto, Numazu; Tomiko Kawakami, Tokyo, all of Japan

[73] Assignee: Ricoh Company, Ltd., Tokyo, Japan

[21] Appl. No.: 96,279

[22] Filed: Nov. 21, 1979

[30] Foreign Application Priority Data

Nov. 27, 1978 [JP] Japan ................................ 53-145356

[51] Int. Cl.[3] ................................................ G03G 5/06
[52] U.S. Cl. ........................................... 430/72; 430/58
[58] Field of Search ........................ 430/70, 72, 79, 58; 260/174, 190

[56] References Cited

U.S. PATENT DOCUMENTS

| | | | |
|---|---|---|---|
| 3,775,105 | 11/1973 | Kukla | 430/80 |
| 3,837,851 | 9/1974 | Shattuck et al. | 430/59 |
| 3,871,882 | 3/1975 | Wiedemann | 430/59 |
| 3,977,870 | 8/1976 | Rochlitz | 430/59 |
| 4,018,607 | 4/1977 | Contois | 430/73 |
| 4,026,704 | 5/1977 | Rochlitz | 430/57 |
| 4,052,210 | 10/1977 | Hectors | 430/72 |

*Primary Examiner*—Edward C. Kimlin
*Assistant Examiner*—John L. Goodrow
*Attorney, Agent, or Firm*—Blanchard, Flynn, Thiel, Boutell & Tanis

[57] ABSTRACT

The present invention provides an electrophotographic element which comprises an electroconductive support and a photosensitive layer, formed thereon, which contains some disazo pigment expressed by the general formula

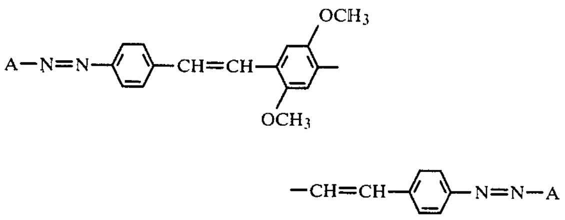

[wherein A represents

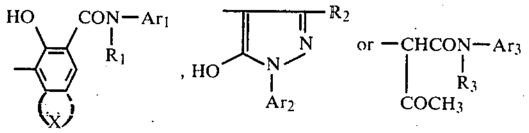

(wherein X represents aromatic ring, hetero ring or substitutes thereof, $Ar_1$ represents aromatic ring, hetero ring or substitutes thereof, $Ar_2$ and $Ar_3$ represents aromatic ring or substitutes thereof, $R_1$ and $R_3$ represents hydrogen, lower alkyl group, phenyl group or substitutes thereof, and $R_2$ represents lower alkyl group, carboxyl group or esters thereof)].

70 Claims, 3 Drawing Figures

ELECTROPHOTOGRAPHIC ELEMENT HAVING 1,4-BIS(AZOSTYRYL)-2,5 DIMETHOXY BENZENE COMPOUNDS AS PHOTOCONDUCTORS

BACKGROUND OF THE INVENTION a Field of the Invention

The present invention relates to a photosensitive element for use in electrophotography, and more particularly it relates to a novel electrophotographic element having a photosensitive layer containing a disazo pigment as effective component.

b Description of the Prior Art

There have hitherto been developed various electrophotographic sensitive elements comprising an electroconductive support and a photosensitive layer formed thereon containing some azo pigment as effective component. For instance, Japanese Patent Publication No. 16474/1969 (U.S. Ser. No. 445,194 now abandoned) discloses an electrophotographic sensitive element employing some monoazo pigment, and Japanese Laid-Open Unexamined Patent Application No. 37543/1972 (U.S. Pat. No. 3,898,084) discloses an electrophotographic element employing some disazo pigment. These azo pigments employed in the prior art are admittedly useful materials to serve as an effective component of electrophotographic elements, but when the various requirements for electrophotographic elements from the view point of the electrophotographic process are taken into consideration, there has, in fact, not been developed any photosensitive element that will meet these requirements satisfactorily. Therefore, it is important to provide a wide variety of pigments useful as effective component, without limiting to azo pigments, so as to permit a wide range of selection. By so doing, it becomes possible to provide an electrophotographic element apposite to a specific process. In other words, for the electrophotographic processes, it is desirable that the variety of pigments to serve as effective component of the electrophotographic elements should be as wide as possible.

SUMMARY OF THE INVENTION

The first object of the present invention is to provide an electrophotographic element containing a novel disazo pigment which can serve as an effective component in performing various electrophotographic processes.

The second object of the present invention is to provide an electrophotographic element which permits a wide range of selection of disazo pigment useful as an effective component thereof.

The third object of the present invention is to provide a novel electrophotographic element with high sensitivity as well as high flexibility which contains such a disazo pigment as described above.

We have prepared a group of disazo pigments and conducted a series of studies on their application to electrophotographic elements. As a result, we found that disazo pigments having the distyryl benzene skeleton expressed by the following general formula are useful as excellent effective components of electrophotographic elements and have accomplished the present invention on the basis of this finding.

In more detail, the present invention provides an electrophotographic element which comprises an electroconductive support and a photosensitive layer formed thereon, which contains some disazo pigment expressed by the general formula

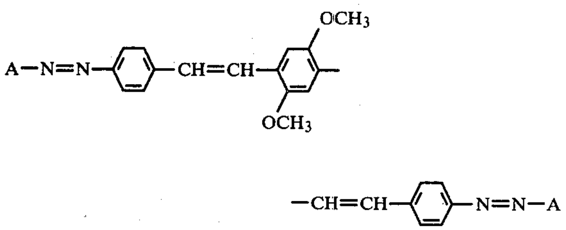

[wherein A represents

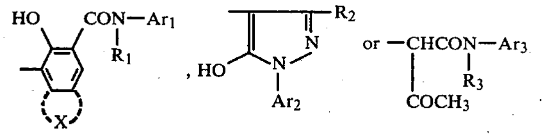

(wherein X represents aromatic ring, hetero ring or substitutes thereof, $Ar_1$ represents aromatic ring, hetero ring or substitutes thereof, $Ar_2$ and $Ar_3$ represent aromatic ring or substitutes thereof, $R_1$ and $R_3$ represent hydrogen, lower alkyl group, phenyl group or substitutes thereof, and $R_2$ represents lower alkyl group, carboxyl group or esters thereof)].

As concrete examples of X in the aforesaid general formula there can be enumerated benzene ring, naphthalene ring, indole ring, carbazole ring, benzofuran ring or substitutes thereof (the substituents including, for instance, halogen). As concrete examples of $Ar_1$ there can be enumerated benzene ring, naphthalene ring, dibenzofuran ring, carbazole ring or substitutes thereof (the substituents including, for instance, halogen, $C_1 \sim C_4$ alkoxy, dialkylamino wherein each alkyl has $1 \sim 4$ carbon atoms, cyano, carboxyl, nitro, or sulfonyl). As concrete examples of $Ar_2$ and $Ar_3$ there can enumerated benzene ring, naphthalene ring and substitutes thereof (the substituents including, for instance, nitro, sulfoamino, sulfonyl, halogen, $C_1 \sim C_4$ alkyl, $C_1 \sim C_{14}$ alkoxy, cyano, dialkylamino wherein each alkyl has $1 \sim 4$ carbon atoms or acylamino wherein alkyl has $1 \sim 4$ carbon atoms). As the lower alkyl group in $R_1$, $R_2$ and $R_3$ can be suitably used those having $1 \sim 4$ carbon atoms. Further, as the substituents of phenyl group in $R_1$ and $R_3$ can be enumerated halogen. Still further, as the carboxylic acid ester group in $R_2$ can be suitably used that having $1 \sim 4$ carbon atoms.

Concrete examples of the compounds expressed by the foregoing general formula that are useful for the present invention will be shown in the following in terms of structural formula.

Compound No.
1.
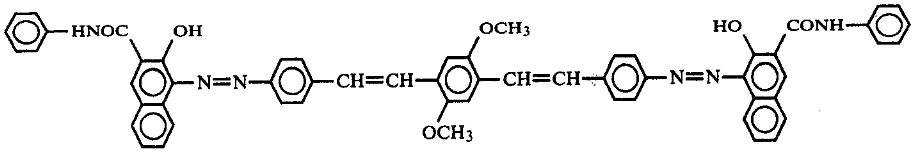
2.
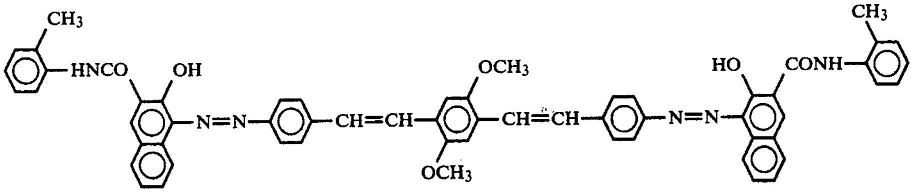
3.
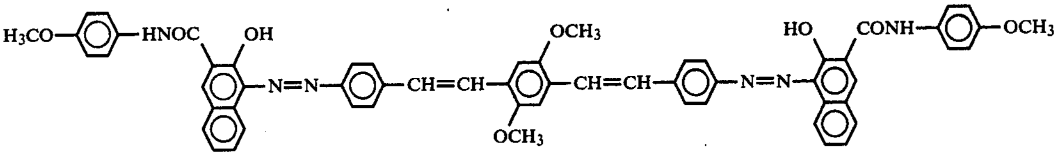
4.
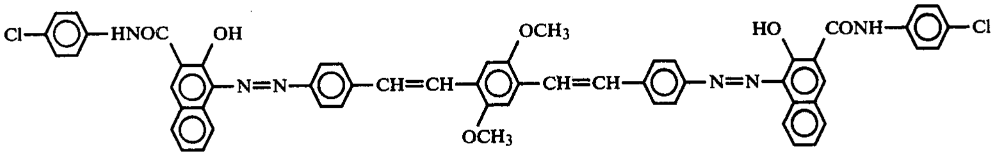
5.
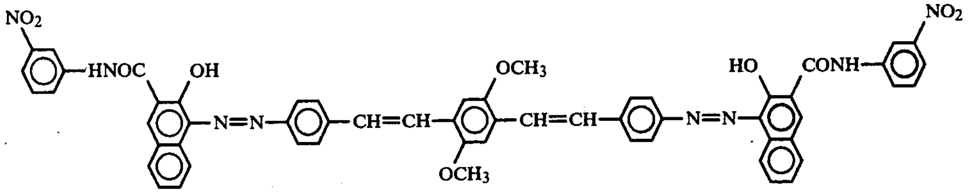
6.
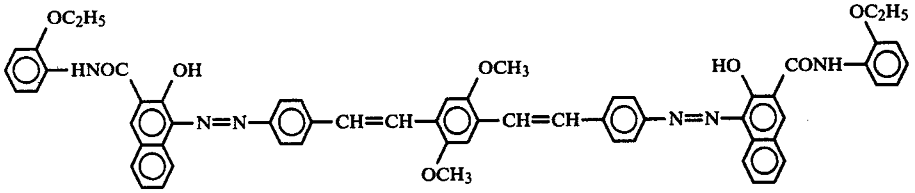
7.
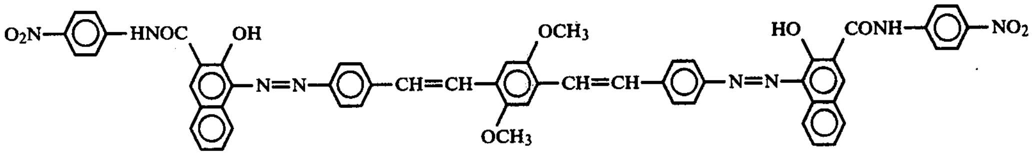
8.
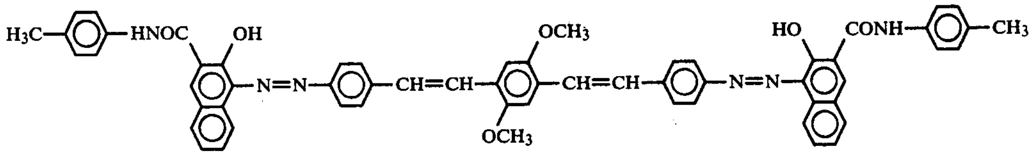
9.
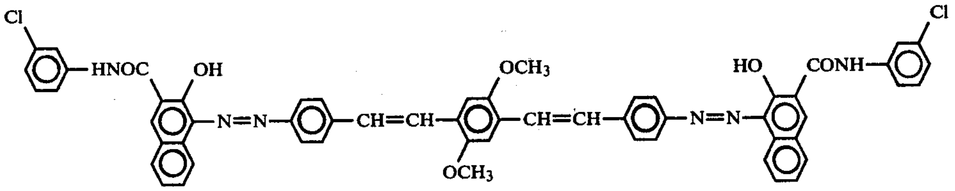
10.
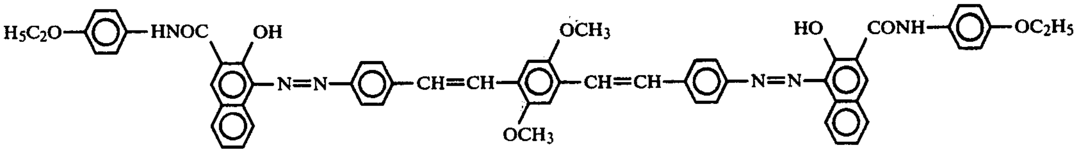

-continued
Compound No.
11.
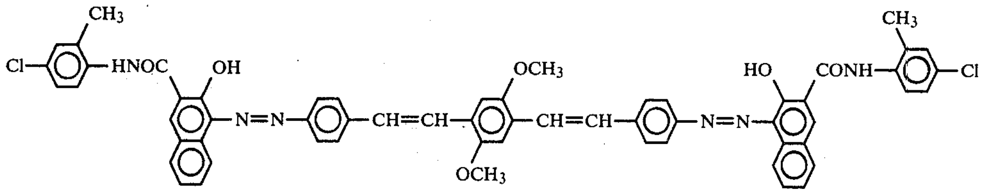
12.
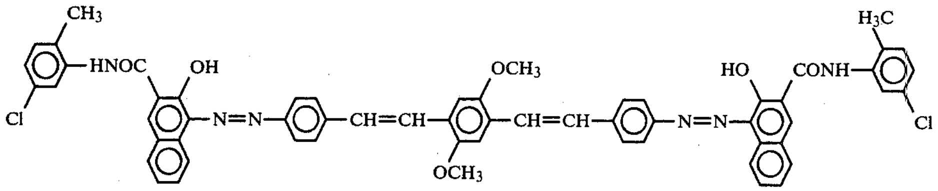
13.
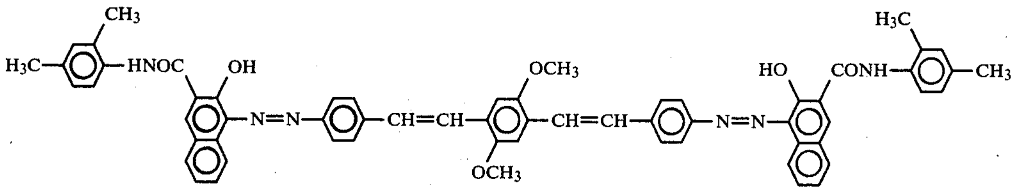
14.
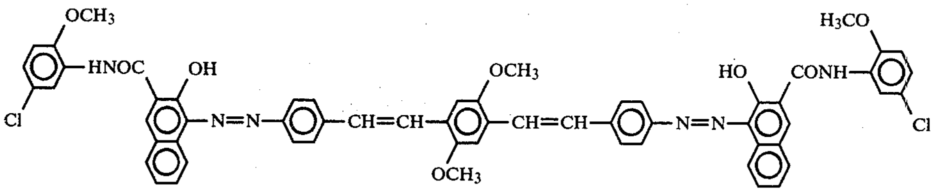
15.
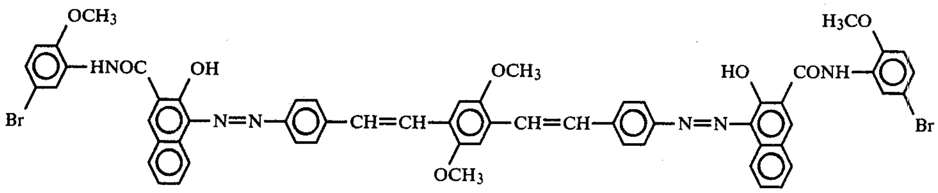
16.
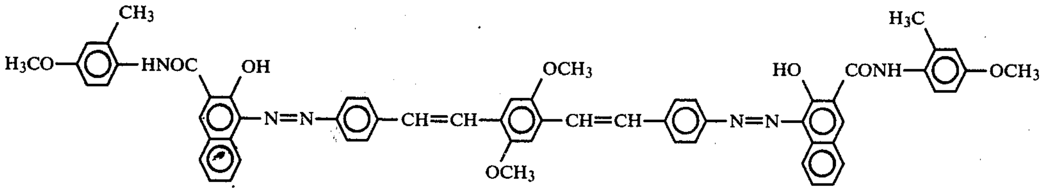
17.
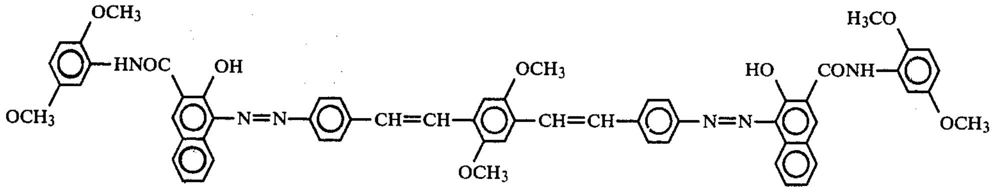
18.
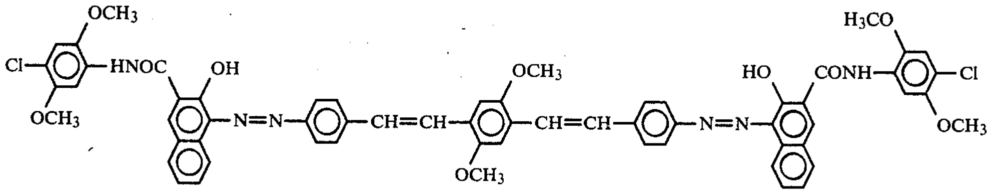
19.
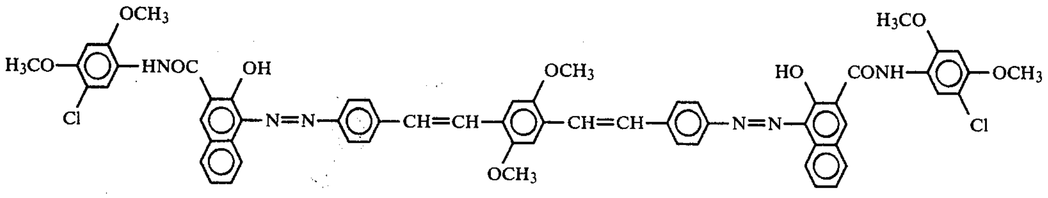

-continued
Compound No.
20.
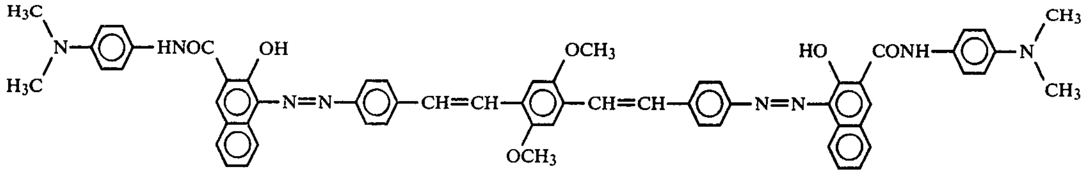
21.
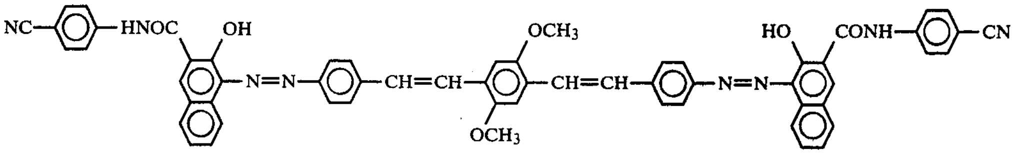
22.
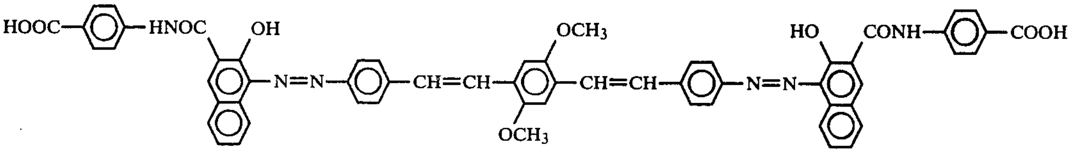
23.
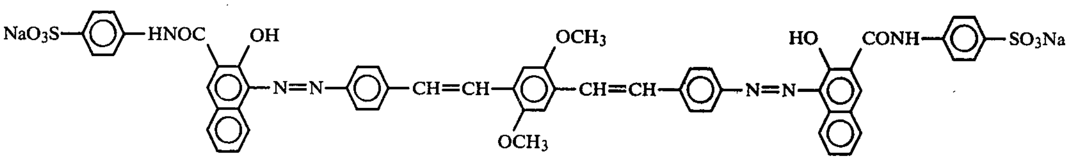
24.
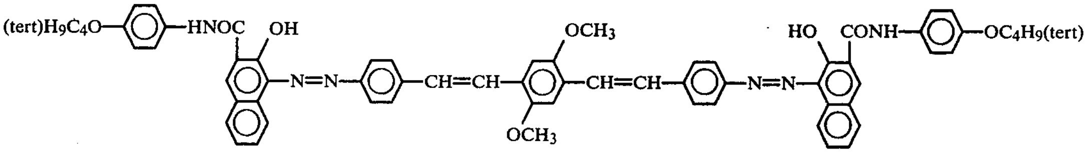
25.
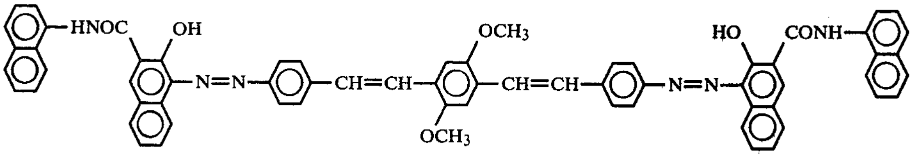
26.
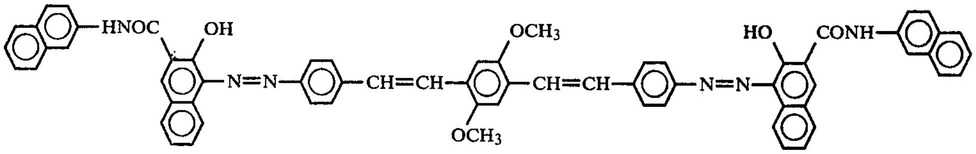
27.
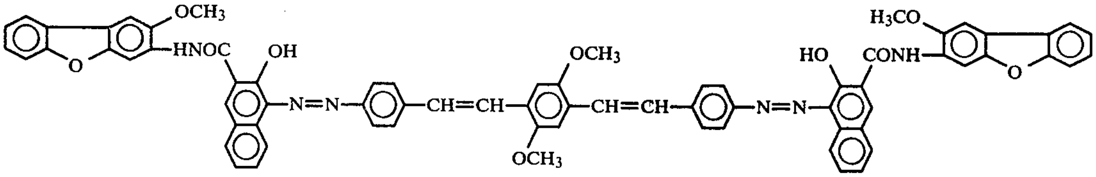
28.
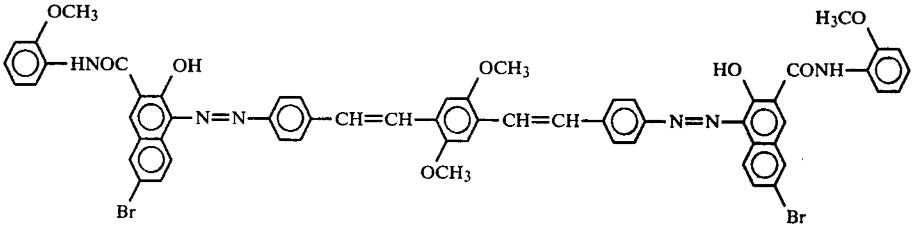

-continued
Compound No.
29.
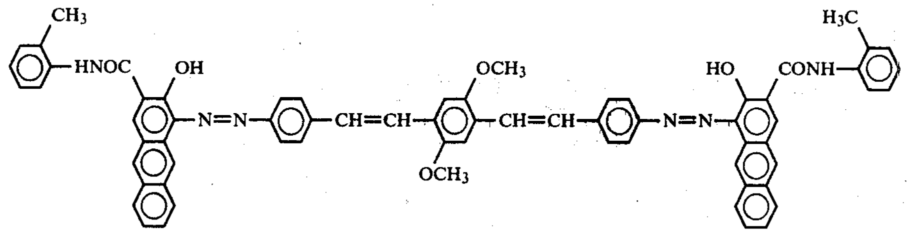
30.
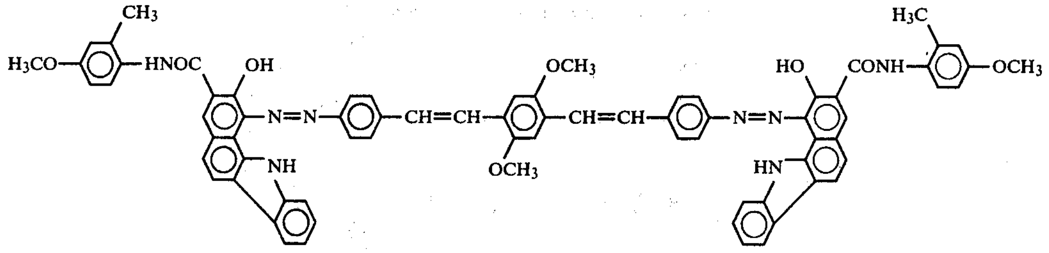
31.
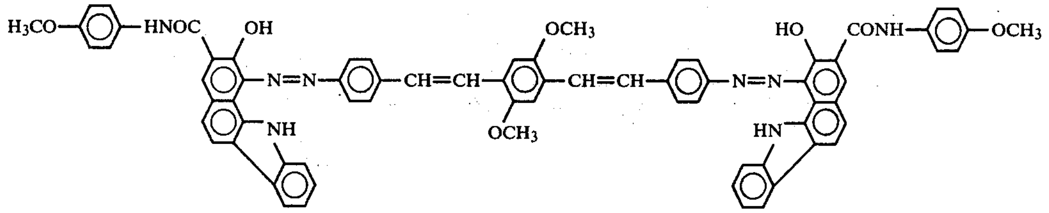
32.
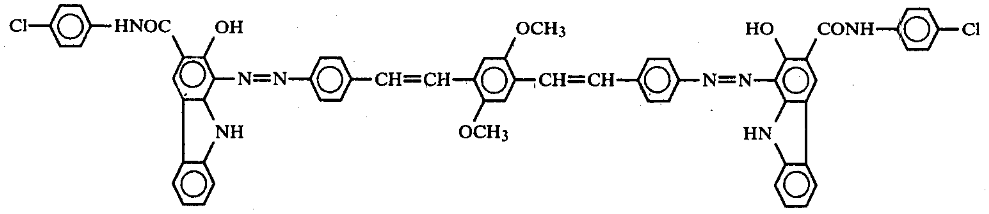
33.
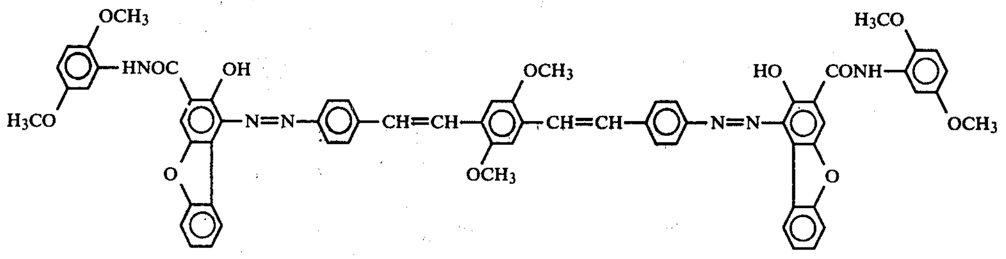
34.
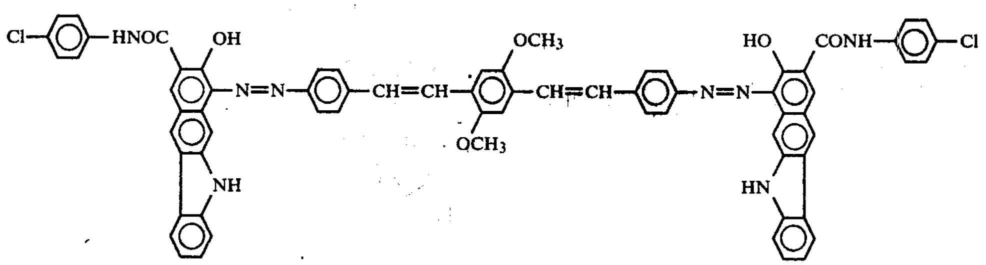
35.
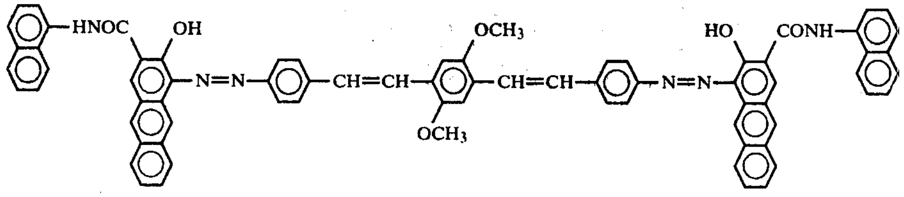

-continued
Compound No.
36.
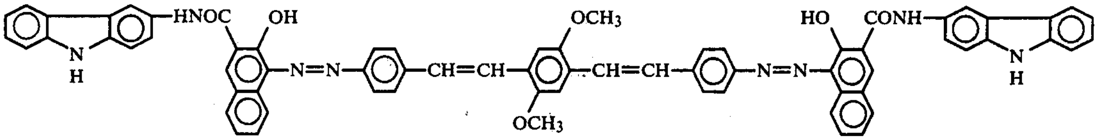
37.
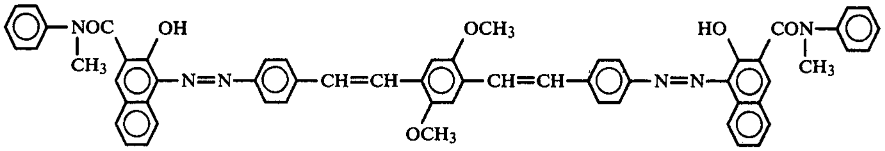
38.
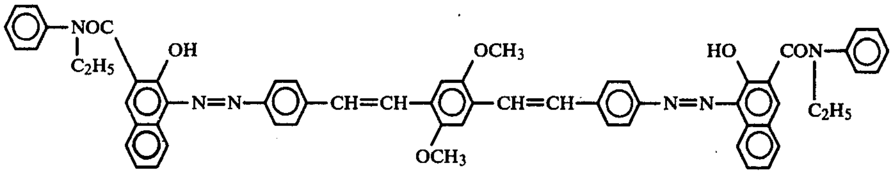
39.
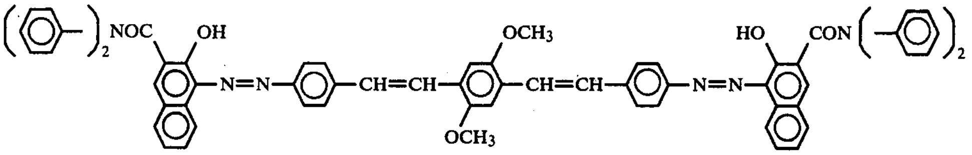
40.
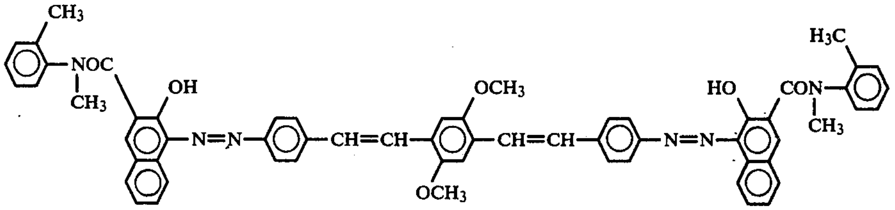
41.
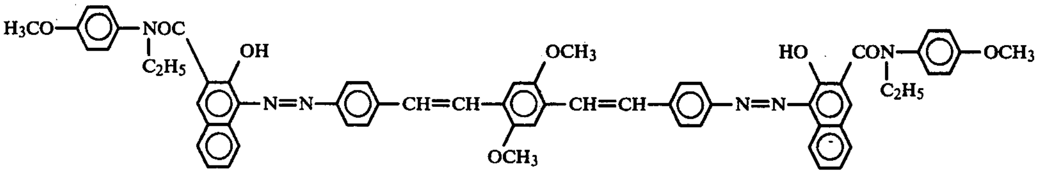
42.
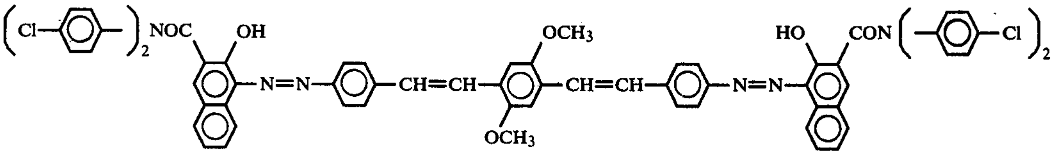
43.
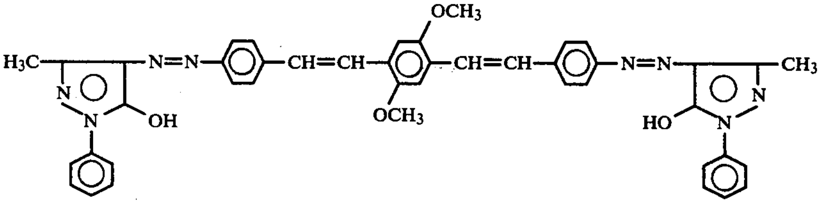
44.
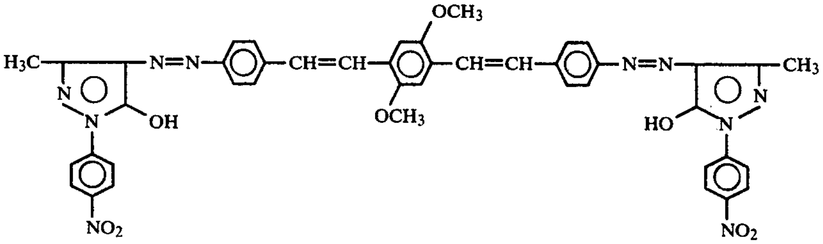

-continued
Compound No.
45.
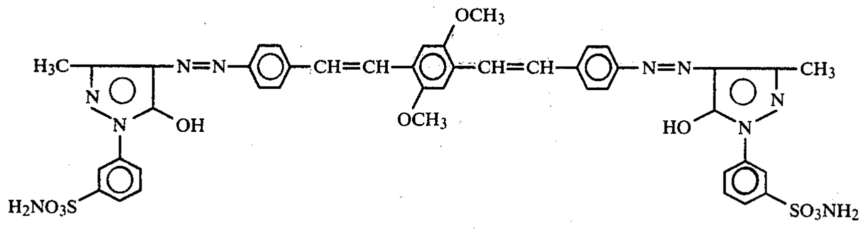
46.
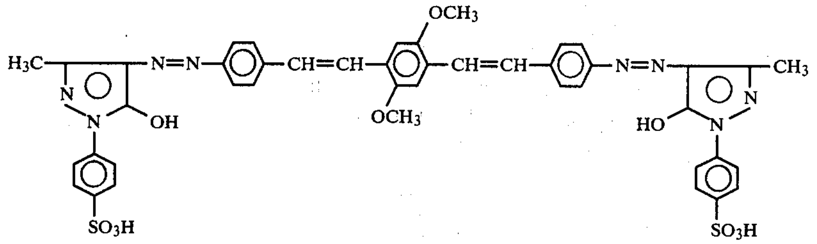
47.
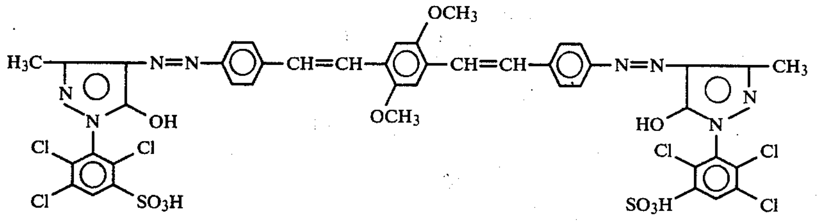
48.
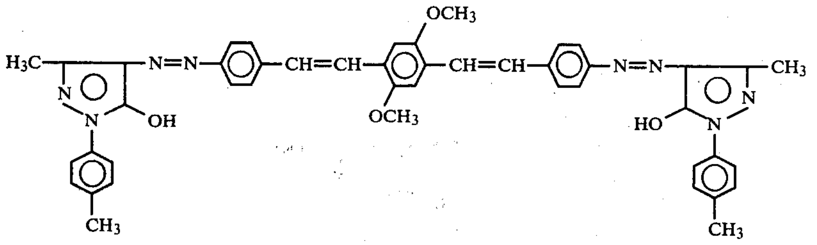
49.
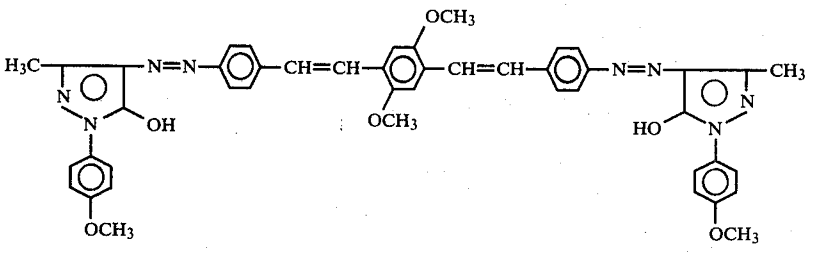
50.
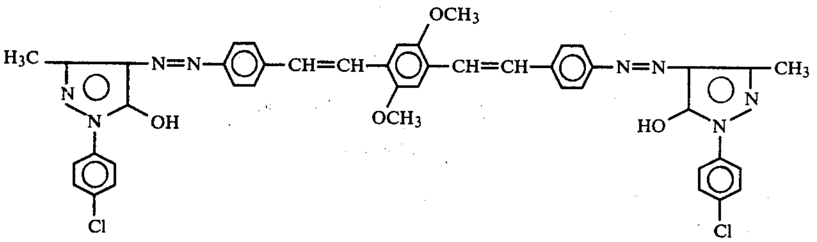
51.
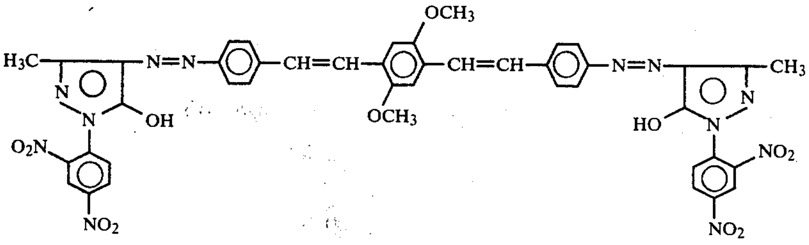

-continued
Compound No.
52.
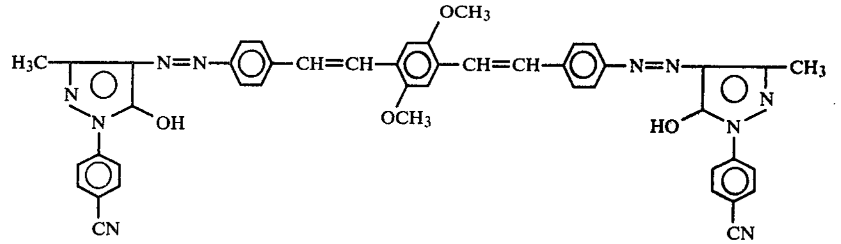
53.
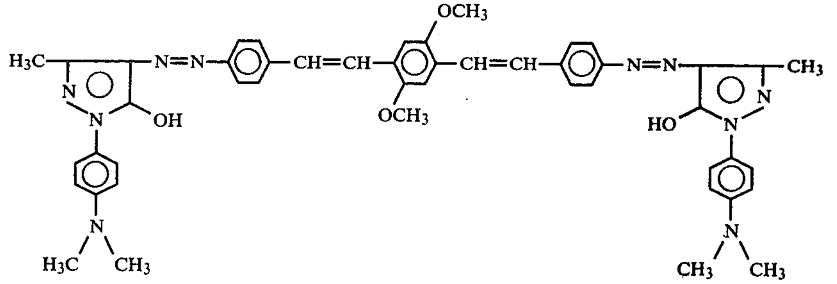
54.
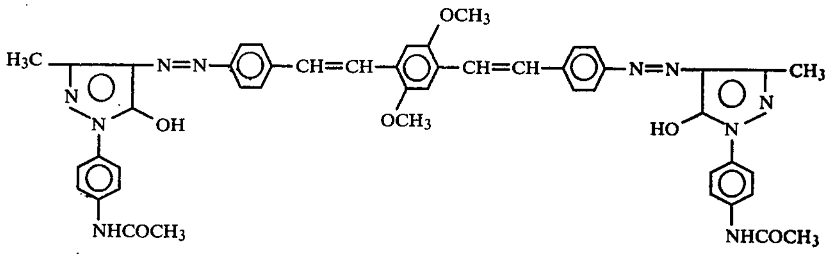
55.
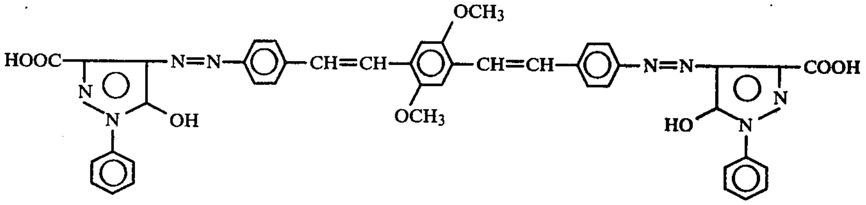
56.
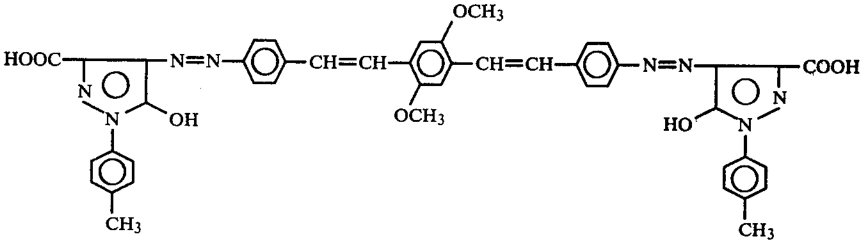
57.
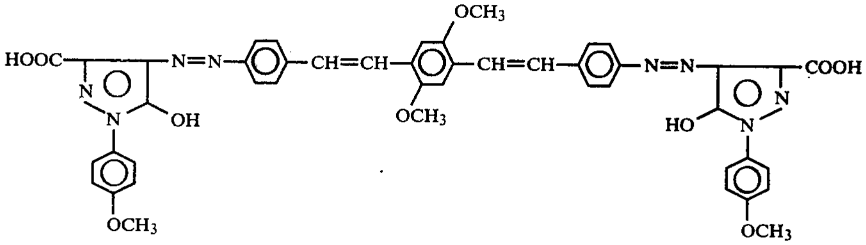
58.
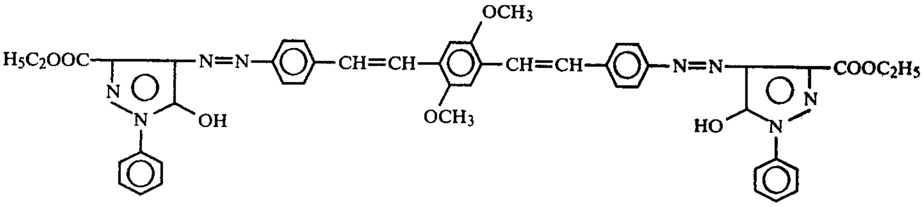

-continued

Compound No.

59.

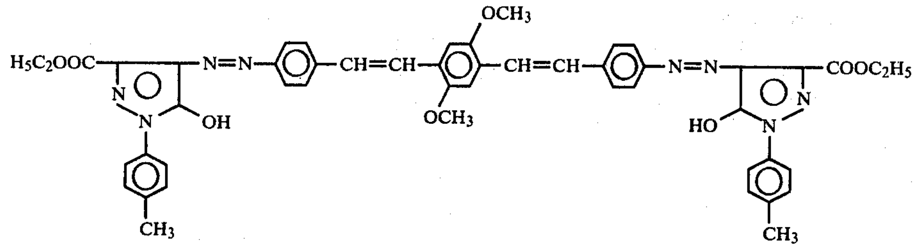

60.

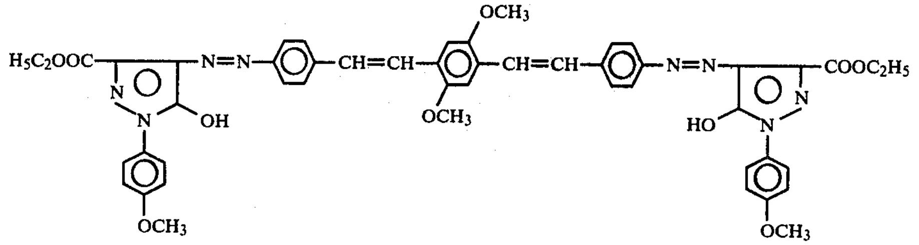

61.

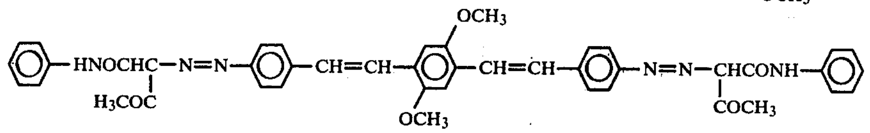

62.

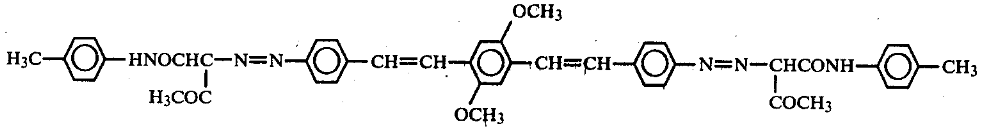

63.

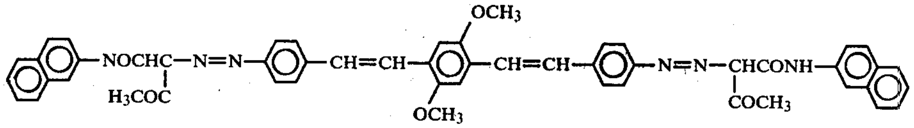

64.

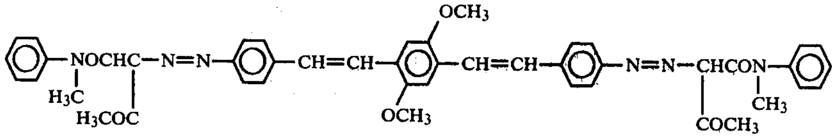

65.

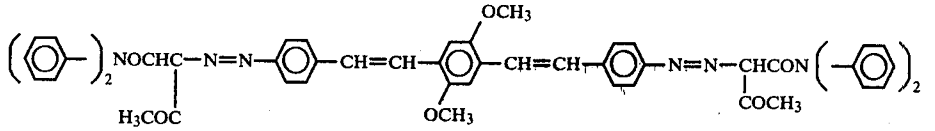

66.

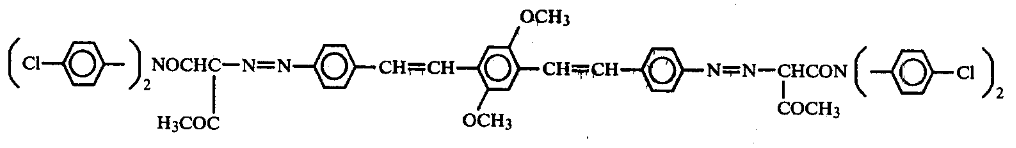

These disazo pigments can be easily prepared by first subjecting 1,4-bis(4-aminostyryl)-2,5-dimethoxybenzene to diazotization for isolation thereof as tetrazonium salt and then effecting coupling reaction between it and the coupler corresponding to the aforesaid each pigment in the presence of alkali in a suitable organic solvent, for instance, such as N,N-dimethylformamide. For instance, the method for preparing the aforesaid pigment No. 1 is as described below. The other disazo pigments can be prepared in accordance with this preparation example except for changing the couplers to be used.

Preparation Example 20.0 g of 1,4-bis(4-aminostyryl)-2,5-dimethoxybenzene was added to a diluted hydrochloric acid prepared from 150 ml of concentrated hydrochloric acid and 150 ml of water and the resulting mixture was thoroughly stirred at 60° C. for about 30 minutes. Next, this mixture was cooled to about 0° C., and a solution of 8.0 g of sodium dissolved in 30 ml of water was added dropwise thereto at a temperature in the range of from −1° C. to 0° C. for about 30 minutes. Thereafter, it was stirred at the same temperature for about 30 minutes to thus separate a small amount of unreacted substance therefrom by filtration. The resulting filtrate was poured into 40 ml of 42% borofluoric acid. The thus separated crystals were taken out by filtration, washed in water and dried to obtain 28.0 g (yield: 90%) of red crystals of tetrazoniumdifluoroborate. The decomposition point was 120° C. Next, 1.5 g of tetrazonium salt thus obtained and 1.5 g of 2-hydroxy-3-anilide naphthoate as coupler were dissolved in 250 ml of cooled N,N-dimethylformamide. A solution comprising 2.6 g of sodium acetate and 30 ml of water was added dropwise thereto at temperature in the range of from 4° C. to 8° C. for 1 hour, and the resulting mixture was stirred at room temperature for about 3 hours. Thereafter, precipitates were taken out by filtration, washed three times in 300 ml of water and further washed eight times in 300 ml of N,N-dimethylformamide. The still remaining N,N-dimethylformamide was washed away with acetone. The thus obtained blue-black crystals were dried at 70° C. under reduced pressure of 2 mm Hg to obtain 2.3 g (yield: 95%) of disazo pigment No. 1. The melting point was 250° C. or more.

Elementary Analysis

| | Calculated | Found |
|---|---|---|
| C (%) | 75.63 | 75.48 |
| H (%) | 4.82 | 4.80 |
| N (%) | 9.13 | 9.11 |

IR absorption spectrum (KBr tablet)

1680 $cm^{-1}$ (secondary amide).

The electrophotographic elements according to the present invention contain such disazo pigments as exemplified above, and they can take various forms illustrated in FIGS. 1 through 3 of the appended drawings depending on the mode of application of these pigments. An electrophotographic element illustrated in FIG. 1 is one prepared by forming a photosensitive layer 2 of disazo pigment 4 (serving herein as photoconductive substance)~binder resin 3 type on an electroconductive support 1. A photosensitive element illustrated in FIG. 2 is one prepared by forming a photosensitive layer 2' of disazo pigment 4 (serving herein as charge-carrier generating substance)~charge-transfer medium (i.e., a mixture of charge-transfer substance and binder resin) 5 type on an electroconductive support 1. An electrophotographic element illustrated in FIG. 3 is a modification of the electrophotographic element of FIG. 2, and the photosensitive layer 2" thereof is composed of a charge generating layer 6 consisting essentially of disazo pigment 4 and a charge-transfer layer 7.

In the case of the electrophotographic element of FIG. 1, the disazo pigment acts as photoconductive substance, and generation and transfer of the charge-carrier necessary for light decay are effected through the medium of pigment particles. In the case of the electrophotographic element of FIG. 2, the charge-transfer substance forms a charge-transfer medium together with the binder (and some plasticizer as occasion calls), while the disazo pigment acts as charge-carrier generating substance. This charge-transfer medium is not capable of generating charge-carrier like disazo pigments, but is capable of accepting and transferring charge-carrier generated from disazo pigments. That is, in the case of the electrophotographic element of FIG. 2, generation of the charge-carrier necessary for light decay is performed by the disazo pigment, while transfer of the charge-carrier is performed mainly by the charge-transfer medium. A fundamental condition that is additionally required of the charge-transfer medium herein is that the absorption wave-length range of the charge-transfer medium should not overlap mainly the absorption wave-length range of the visible region of the disazo pigment. The reason is that, in order to cause the disazo pigment to generate charge-carrier efficiently, it is necessary to permeate light to the surface of pigment. The foregoing condition, however, does not apply to, for instance, an electrophotographic element which is sensitive to a specific wave-length alone. Therefore, the absorption wave-length of the charge-transfer medium and that of the disazo pigment may partially overlap but should not completely overlap each other. Next, in the case of the electrophotographic element of FIG. 3, light penetrated the charge-transfer layer reaches to the photosensitive layer 2" which is a charge generating layer to cause the disazo pigment of that portion to generate charge-carrier, while the charge-transfer layer accepts the pouring of charge-carrier and performs transfer thereof, and the mechanism of effecting transfer of the charge-carrier by means of the charge-transfer medium is the same as in the case of the electrophotographic element illustrated in FIG. 2. The disazo pigment herein is also a charge-carrier generating substance.

In order to prepare the electrophotographic element of FIG. 1, it will do to coat a dispersion obtained by dispersing fine particles of a disazo pigment in a solution of binder on an electroconductive support and dry thereafter. In order to prepare the electrophotographic element of FIG. 2, it will do to disperse fine particles of a disazo pigment in a solution obtained by dissolving a charge-transfer substance and a binder, coat the resulting dispersion on an electroconductive support and dry thereafter. The electrophotographic element of FIG. 3 can be prepared either by depositing a disazo pigment on an electroconductive support by vacuum evaporation or by the process comprising dispersing fine particles of a disazo pigment in an appropriate solvent which may contain a binder dissolved therein as occasion demands, coating this dispersion on an electroconductive support and drying, subjecting the thus formed coating film to surface finishing or adjusting the thickness thereof by such means as buffing, etc. as occasion demands, and then coating a solution containing a charge-transfer substance and a binder on the film and drying thereafter. In any case, the disazo pigment for use in the present invention is employed after pulverizing into particle diameter of 5 microns or less, preferably 2 microns or less, by means of a ball mill or the like. The coating is performed by conventional means such as doctor blade, wire bar, etc. The thickness of the photosensitive layer is about 3 to 50 microns, preferably 5 to 20 microns, in the case of the electrophotographic elements of FIG. 1 and FIG. 2. In the case of the electrophotographic element of FIG. 3, the appropriate thickness of the charge generating layer is about 0.01 to 5 microns, preferably about 0.03~2 microns, while the appropriate thickness of the charge-transfer layer is about 3 to 50 microns, preferably about 5 to 20 microns. Further, in the electrophotographic element of FIG. 1, the appropriate amount of the disazo pigment contained in the photosensitive layer is about 30 to 70% by weight, preferably about 50% by weight, relative to the photosensitive layer. (As stated above, in the case of the photosensitive element of FIG. 1, the disazo pigment acts as photoconductive substance and generation and transfer of the charge-carrier necessary for light decay are performed by means of pigment particles. Therefore, it is desirable that contact between pigment particles be continuous from the surface of the photosensitive layer to the support. Accordingly, it is desirable that the content of the pigment in the photosensitive layer be relatively large. However, when the strength and sensitivity of the photosensitive layer are taken into consideration, the appropriate content is about 50% by weight.) In the electrophotographic element of FIG. 2, the content of the disazo pigment in the photosensitive layer accounts for about 1 to 50% by weight, preferably 20% by weight or less, while the content of the charge-transfer substance therein accounts for about 10 to 95% by weight, preferably 30 to 90% by weight. The content of the charge-transfer substance in the charge-transfer layer in the case of the electrophotographic element of FIG. 3 accounts for about 10 to 95% by weight, preferably 30 to 90% by weight, like in the case of the photosensitive layer of the electrophotographic element of FIG. 2. Further, in preparing any of the electrophotographic elements shown in FIGS. 1 through 3, some plasticizer can be employed jointly with the binder.

As the electroconductive support for the electrophotographic elements of the present invention, a plate or a foil of a metal such as aluminum, a plastic film deposited with a metal such as aluminum by vacuum evaporation, a paper processed for conductivity, etc. are useful. As the binder for the present invention, condensation resins such as polyamide, polyurethane, polyester, epoxide resin, polyketone, polycarbonate, etc. and vinyl polymers such as polyvinyl ketone, polystyrene, poly-N-vinyl carbazole, polyacrylamide, etc. can be cited, but any other resin will do as long as the insulating property and the adhesive property thereof are sufficient. As the plasticizer applicable to the present invention, halogenated paraffin, polybiphenyl chloride, dimethyl naphthalene, dibutyl phthalate, etc. can be cited. To cite charge-transfer substances suitable for the present invention, as high-molecular substance, there are vinyl polymers such as poly-N-vinyl carbazole, halogenated poly-N-vinyl carbazole, polyvinyl pyrene, polyvinyl indoloquinoxaline, polyvinyl dibenzothiophene, polyvinyl anthracene, polyvinyl acridine, etc. and condensation resins such as pyrene~formaldehyde resin, bromopyrene~formaldehyde resin, ethyl carbazole~formaldehyde resin, chloroethyl carbazole~formaldehyde resin, etc., and as low-molecular substance (monomer), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno-[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno-[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrobenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4H-dicyanomethylene-4H-indeno[1,2-b]thiophene, 1,3,7,9-tetranitrobenzo[c]-cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinone benzo[a]anthracene-7,12-dione, 2,4,7-trinitro-9-dicyanomethylene-fluorene, tetrachlorophthalic anhydride, 1-bromopyrene, 1-methyl pyrene, 1-ethyl pyrene, 1-acetyl pyrene, carbazole, N-ethyl carbazole, N-β-chloroethyl carbazole, N-β-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)methane, 3,6-bis(dibenzylamino)-9-ethyl carbazole, etc. These charge-transfer substances are employed either independently or in the form of a mixture of two or more of them.

All the electrophotographic elements prepared as above can be further provided with an adhesive layer or a barrier layer, as occasion demands, which is interposed between the electroconductive support and the photosensitive layer. As the material to form this layer, polyamide, nitrocellulose, aluminum oxide, etc. are appropriate, and the thickness of the layer is preferably 1 micron or less.

In order to obtain copies by employing an electrophotographic element of the present invention, it suffices to charge the element by its photosensitive layer side, expose to light, develop thereafter, transfer the developed image to a common paper or the like as occasion demands and fix.

Electrophotographic elements according to the present invention have excellent advantages such that they are generally high in sensitivity and rich in flexibility.

BRIEF DESCRIPTION OF THE DRAWINGS

FIGS. 1 through 3 illustrate a diagrammatic cross-sectional view each, on an enlarged scale, of various electrophotographic elements according to the present invention, in which:

Figure 1:
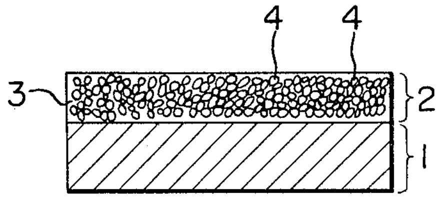

1: an electroconductive support
2,2',2": a photosensitive layer
3: a binder
4: a disazo pigment
5: a charge-transfer medium
6: a charge-carrier generating layer
7: a charge-transfer medium layer

DESCRIPTION OF THE PREFERRED EMBODIMENTS

Example 1.

1 part of weight of polyester resin (namely, Polyester Adhesive 49000, the manufacture of Du Pont Inc.), 1 part of weight of disazo pigment No. 1 and 26 parts of weight of tetrahydrofuran were crushed and mixed within a ball mill, and the resulting dispersion was coated, by means of a doctor blade, on a polyester film deposited with aluminum by vacuum evaporation and was dried at 100° C. for 10 minutes, whereby there was obtained an electrophotographic element having a 7-micron thick photosensitive layer and assuming the form illustrated in FIG. 1.

Next, the photosensitive layer side of this electrophotographic element was positively charged by means of corona discharge of +6 KV for 20 seconds in a commercial testing apparatus for electrostatic copying paper, and then the surface potential Vpo (volt) thereof was measured after standing it for 20 seconds in the dark. Subsequently, the photosensitive layer of this element was exposed to the light of a tungsten lamp so as to attain the surface illumination of 20 luxes, and the amount of exposure $E\frac{1}{2}$ (in terms of lux·sec.) was determined from the time of exposure (in terms of second) required for decrease of the surface potential Vpo to half. The results were as follows:

Vpo:410 V, $E\frac{1}{2}$:2.5 lux·sec.

Examples 2 through 10

A variety of electrophotographic elements were prepared by applying the same procedure as that in Example 1 except for replacing disazo pigment No. 1 employed therein with the disazo pigments having their serial numbers as shown in the following Table-1 respectively. When the same measurement as in Example 1 was conducted on each of these electrophotographic elements, the results were as shown in Table-1 respectively.

TABLE 1

| Example No. | Disazo pigment No. | Vpo (volt) | El/2 (lux . sec) |
|---|---|---|---|
| 2 | 4 | 440 | 6.0 |
| 3 | 15 | 860 | 2.0 |
| 4 | 17 | 610 | 4.2 |
| 5 | 29 | 610 | 18.0 |
| 6 | 32 | 740 | 7.0 |
| 7 | 44 | 630 | 17.5 |
| 8 | 49 | 530 | 27.5 |
| 9 | 51 | 640 | 10.0 |
| 10 | 63 | 650 | 40.0 |

Example 11

Figure 2:
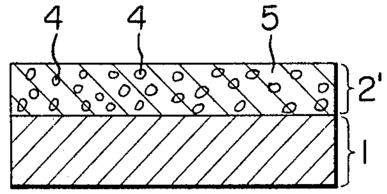

10 parts by weight of the same polyester resin as used in Example 1, 10 parts by weight of 2,4,7-trinitro-9-fluorenone, 2 parts by weight of disazo pigment No. 1 and 198 parts by weight of tetrahydrofuran were crushed and mixed within a ball mill, and the resulting dispersion was coated, by means of a doctor blade, on a polyester film deposited with aluminum through vacuum evaporation and was dried at 100° C. for 10 minutes, whereby there was obtained an electrophotographic element having a 10-micron thick photosensitive layer and assuming the form illustrated in FIG. 2. Next, this electrophotographic element was subjected to the same measurement as in Example 1 to determine the values of Vpo and $E\frac{1}{2}$ except for applying corona discharge of −6 KV. The results were as follows:

Vpo:560 V, $E\frac{1}{2}$:9.5 lux·sec.

Example 12 through 20

A variety of electrophotographic elements assuming the form illustrated in FIG. 2 were prepared by applying the same procedure as that in Example 11 except for replacing disazo pigment No. 1 employed therein with the disazo pigments having their serial numbers as shown in the following Table-2 respectively. When the values of Vpo and $E\frac{1}{2}$ of each element were determined in the same way as in Example 11, the results were as shown in Table-2.

TABLE 2

| Example No. | Disazo pigment No. | Vpo (volt) | El/2 (lux . sec) |
|---|---|---|---|
| 12 | 7 | 610 | 5.5 |
| 13 | 9 | 350 | 3.0 |
| 14 | 12 | 345 | 5.0 |
| 15 | 15 | 710 | 18.0 |
| 16 | 22 | 760 | 6.0 |
| 17 | 38 | 550 | 4.5 |
| 18 | 54 | 810 | 22.0 |
| 19 | 60 | 310 | 15.0 |
| 20 | 66 | 535 | 11.0 |

Example 21

10 parts by weight of the same polyester resin as used in Example 1, 10 parts by weight of 2,5-bis(4-diethylaminophenyl)-1,3,4-oxadiazole, 2 parts by weight of disazo pigment No. 1 and 198 parts by weight of tetrahydrofuran were crushed and mixed within a ball mill, and the resulting dispersion was coated, by means of a doctor blade, on a polyester film deposited with aluminum through vacuum evaporation and was dried at 120° C. for 10 minutes, whereby there was obtained an electrophotographic element having a 10-micron thick photosensitive layer and assuming the form illustrated in FIG. 2. Next, this electrophotographic element was subjected to the same measurement as in Example 1 to determine the values of Vpo and $E\frac{1}{2}$. The results were as follows:

Vpo:1050 V, $E\frac{1}{2}$:3.5 lux·sec.

Example 22 through 30

A variety of electrophotographic elements assuming the form illustrated in FIG. 2 were prepared by applying the same procedure as that in Example 21 except for replacing disazo pigment No. 1 employed therein with the disazo pigments having their serial numbers as shown in the following Table-3 respectively. When the values of Vpo and $E\frac{1}{2}$ of each element were determined in the same way as in Example 1, the results were as shown in Table-3.

TABLE 3

| Example No. | Disazo pigment No. | Vpo (volt) | El/2 (lux . sec) |
|---|---|---|---|
| 22 | 4 | 1250 | 3.0 |
| 23 | 13 | 1100 | 1.5 |
| 24 | 14 | 1200 | 2.0 |
| 25 | 21 | 1250 | 9.0 |
| 26 | 27 | 740 | 10.0 |
| 27 | 29 | 850 | 6.5 |
| 28 | 46 | 855 | 11.5 |
| 29 | 55 | 830 | 27.0 |
| 30 | 62 | 1160 | 19.0 |

Example 31

200 parts by weight of poly-N-vinylcarbazole, 33 parts by weight of 2,4,7-trinitro-9-fluorenone, 20 parts by weight of polyester resin (the same substance as used in Example 1) and 20 parts by weight of disazo pigment No. 1 were added to 1780 parts by weight of tetrahydrofuran. The same was crushed and mixed within a ball mill, and the resulting dispersion was coated, by means of a doctor blade, on a polyester film deposited with aluminum through vacuum evaporation and was dried at 100° C. for 10 minutes followed by additional 5 minutes' drying at 120° C., whereby there was obtained an electrophotographic element having a 13-micron thick photosensitive layer and assuming the form illustrated in FIG. 2. This electrophotographic element was subjected to the same measurement as in Example 1 to determine the values of Vpo and E½. The results were as follows:

Vpo:860 V, E½:4.0 lux·sec.

Example 32 through 40

A variety of electrophotographic elements assuming the form illustrated in FIG. 2 were prepared by applying the same procedure as that in Example 1 except for replacing disazo pigment No. 1 employed therein with the disazo pigments having their serial numbers as shown in the following Table-4 respectively. When the values of Vpo and E½ of each element were determined in the same way as in Example 1, the results were as shown in Table-4.

TABLE 4

| Example No. | Disazo pigment No. | Vpo (volt) | El/2 (lux . sec) |
|---|---|---|---|
| 32 | 9 | 840 | 8.0 |
| 33 | 10 | 750 | 4.5 |
| 34 | 12 | 840 | 12.0 |
| 35 | 19 | 1160 | 8.0 |
| 36 | 26 | 1210 | 4.0 |
| 37 | 40 | 1110 | 9.5 |
| 38 | 55 | 850 | 10.5 |
| 39 | 58 | 760 | 13.0 |
| 40 | 63 | 910 | 15.0 |

Example 41

2 parts by weight of disazo pigment No. 1 and 98 parts by weight of tetrahydrofuran were crushed and mixed within a ball mill, and the resulting dispersion was coated, by means of a doctor blade, on a polyester film deposited with aluminum through vacuum evaporation and was subjected to natural drying, whereby there was formed a 1-micron thick charge-carrier generating layer. On the other hand, 2 parts by weight of 2,4,7-trinitro-9-fluorenon, 2 parts by weight of polycarbonate (namely, Panlite L, the manufacture of TEIJIN Inc.) and 46 parts by weight of tetrahydrofuran were mixed to prepare a dispersion. Then, this dispersion was coated on the foregoing charge-carrier generating layer by means of a doctor blade and was dried at 100° C. for 10 minutes to form a 10-micron thick charge-transfer medium layer, whereby there was obtained an electrophotographic element assuming the form illustrated in FIG. 3. When the values of Vpo and E½ of the thus obtained element were determined in the same way as in Example 1, the results were as follows:

Vpo:740 V, E½:10.0 lux·sec.

Example 42 through 50

Figure 3:
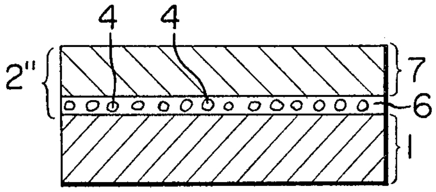

A variety of electrophotographic elements assuming the form illustrated in FIG. 3 were prepared by applying the same procedure as that in Example 41 except for replacing disazo pigment No. 1 employed therein with the disazo pigments having their serial numbers as shown in the following Table-5 respectively. The values of Vpo and E½ of these electrophotographic elements were as shown in Table-5.

TABLE 5

| Example No. | Disazo pigment No. | Vpo (volt) | El/2 (lux . sec) |
|---|---|---|---|
| 42 | 8 | 1140 | 9.0 |
| 43 | 11 | 740 | 3.0 |
| 44 | 16 | 1030 | 7.0 |
| 45 | 19 | 1120 | 18.0 |
| 46 | 22 | 620 | 5.0 |
| 47 | 27 | 1030 | 21.0 |
| 48 | 39 | 920 | 12.5 |
| 49 | 48 | 750 | 24.0 |
| 50 | 64 | 720 | 15.5 |

Example 51

2 parts by weight of disazo pigment No. 1 and 98 parts by weight of tetrahydrofuran were crushed and mixed within a ball mill, and the resulting dispersion was coated, by means of a doctor blade, on a polyester film deposited with aluminum through vacuum evaporation and was subjected to natural drying, whereby there was formed a 1-micron thick charge-carrier generating layer. On the other hand, 2 parts by weight of 2,5-bis(4-diethylaminophenyl)-1,3,4-oxadiazole, 2 parts by weight of polycarbonate (the same substance as employed in Example 41) and 46 parts by weight of tetrahydrofuran were mixed to prepare a dispersion. Then, this dispersion was coated on the foregoing charge-carrier generating layer by means of a doctor blade and was dried at 120° C. for 10 minutes to form a 10-micron thick charge-transfer medium layer, whereby there was obtained a laminate-type electrophotographic element illustrated in FIG. 3. When the thus obtained electrophotographic element was subjected to the same measurement as in Example 1 to determine the values of Vpo and E½ thereof except for applying corona discharge of −6 KV, the results were as follows:

Vpo:940 V, E½:3.0 lux·sec.

Examples 52 through 60

A variety of electrophotographic elements similar to that of Example 51 were prepared by applying the same procedure as that in Example 51 except for replacing disazo pigment No. 1 employed therein with the disazo pigments having their serial numbers as shown in the following Table-6 respectively.

The values of Vpo and E½ of these electrophotographic elements were as shown in Table-6.

TABLE 6

| Example No. | Disazo pigment No. | Vpo (volt) | El/2 (lux . sec) |
|---|---|---|---|
| 52 | 2 | 1350 | 1.5 |
| 53 | 11 | 1240 | 4.0 |
| 54 | 16 | 1140 | 2.0 |
| 55 | 21 | 1250 | 8.5 |
| 56 | 31 | 1120 | 15.0 |
| 57 | 33 | 950 | 9.0 |
| 58 | 39 | 1110 | 7.5 |
| 59 | 41 | 960 | 21.0 |
| 60 | 61 | 965 | 25.0 |

What is claimed is:

1. An electrophotographic element which comprises an electrically conductive support and a photosensitive layer formed thereon, said photosensitive layer consisting essentially of a disazo compound having the formula

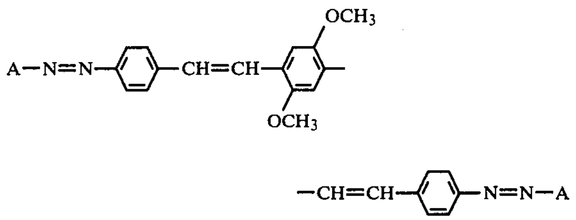

wherein A is a member selected from the group consisting of

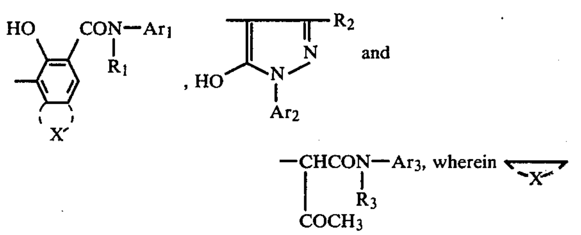

is a fused ring selected from the group consisting of benzene ring, halobenzene ring, naphthalene ring, indole ring, carbazole ring and benzofuran ring; $Ar_1$ is a member selected from the group consisting of phenyl, naphthyl, dibenzofuryl, carbazolyl, substituted phenyl, substituted naphthyl, substituted dibenzofuryl and substituted carbazolyl wherein the substituents are selected from the group consisting of halogen, $C_1$–$C_4$ alkoxy, dialkylamino wherein each alkyl has 1–4 carbon atoms, cyano, carboxyl, nitro and $SO_3Na$; each of $Ar_2$ and $Ar_3$ is a member selected from the group consisting of phenyl, naphthyl, substituted phenyl and substituted naphthyl wherein the substituents are selected from the group consisting of nitro, $SO_3NH_2$, $SO_3H$, halogen, $C_1$–$C_4$ alkyl, $C_1$–$C_{14}$ alkoxy, cyano, dialkylamino wherein each alkyl has 1–4 carbon atoms and acylamino having 1–4 carbon atoms; each of $R_1$ and $R_3$ is a member selected from the group consisting of hydrogen, alkyl having 1–4 carbon atoms, phenyl and halophenyl; and $R_2$ is a member selected from the group consisting of alkyl having 1–4 carbon atoms, carboxyl and esters thereof wherein the ester-forming group has 1–4 carbon atoms; and a resin binder.

2. An electrophotographic element according to claim 1 wherein the thickness of said photosensitive layer is in the range of from about 3μ to about 50μ.

3. An electrophotographic element according to claim 1 wherein the amount of said disazo compound is in the range of from about 30 wt.% to about 70 wt.% relative to the photosensitive layer.

4. An electrophotographic element according to claim 1 wherein A is

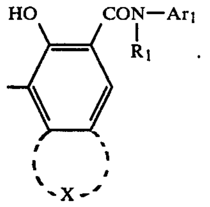

5. An electrophotographic element according to claim 1 wherein A is

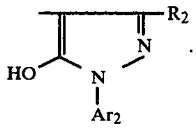

6. An electrophotographic element according to claim 1 wherein A is

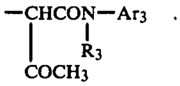

7. An electrophotographic element according to claim 1 wherein the disazo compound is

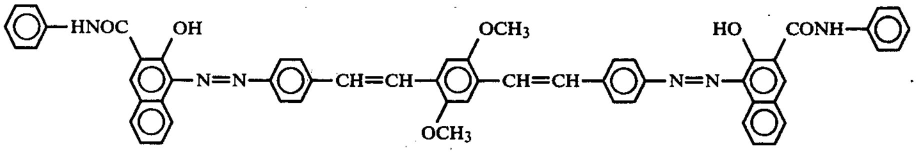

8. An electrophotographic element according to claim 1 wherein the disazo compound is

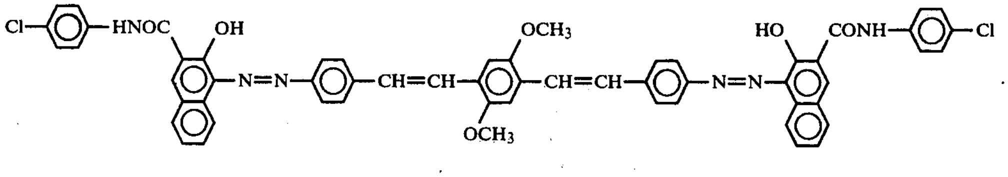

9. An electrophotographic element according to claim 1 wherein the disazo compound is

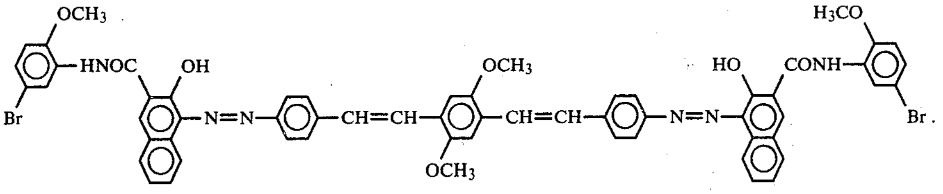

10. An electrophotographic element according to claim 1 wherein the disazo compound is 12. An electrophotographic element according to claim 1 wherein the disazo compound is

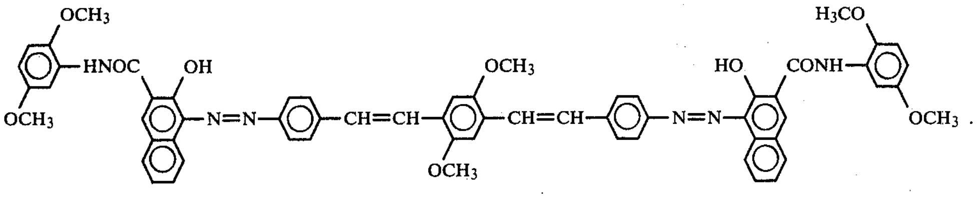

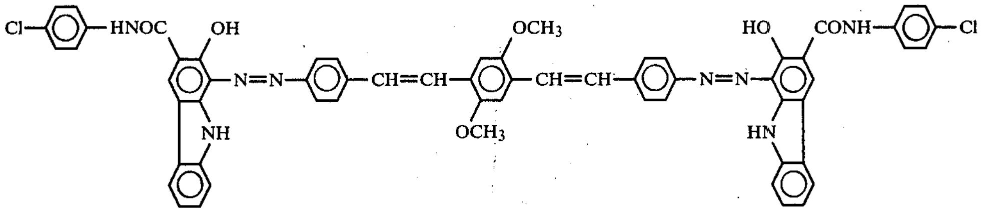

11. An electrophotographic element according to claim 1 wherein the compound expressed by the afore- 13. An electrophotographic element according to claim 1 wherein the disazo compound is

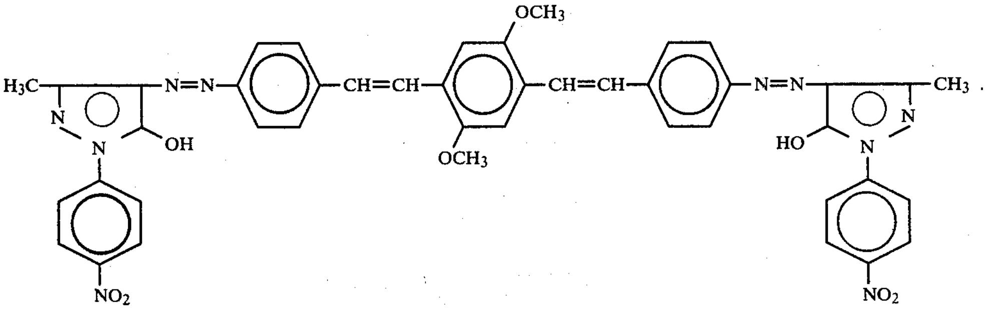

said formula is

14. An electrophotographic element according to claim 1 wherein the disazo compound is

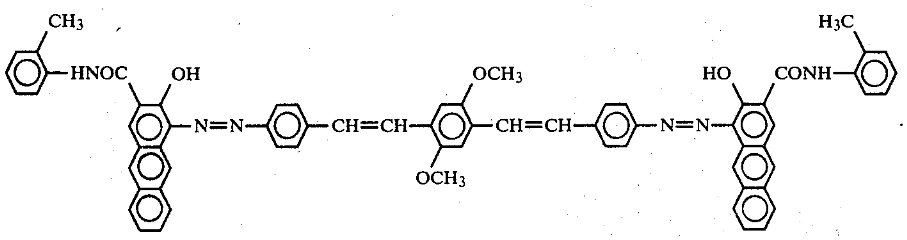

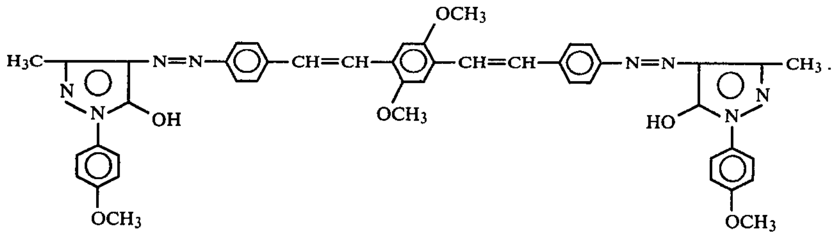

15. An electrophotographic element according to claim 1 wherein the disazo compound is

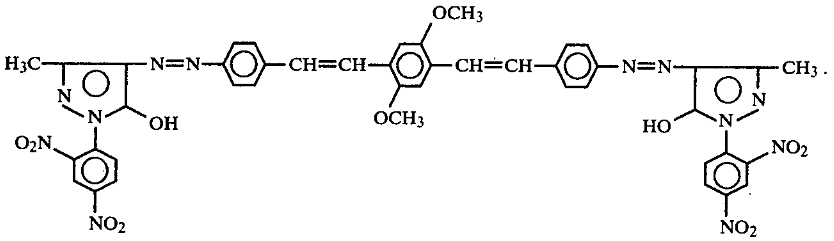

16. An electrophotographic element according to claim 1 wherein the disazo compound is

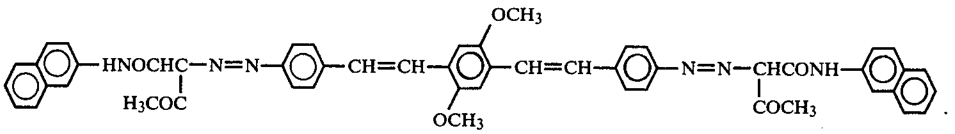

17. An electrophotographic element which comprises an electrically conductive support and a photosensitive layer formed thereon, said photosensitive layer consisting essentially of a disazo compound having the formula

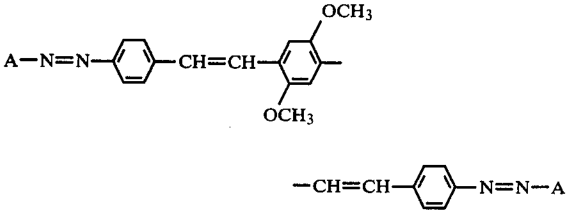

wherein A is a member selected from the group consisting of

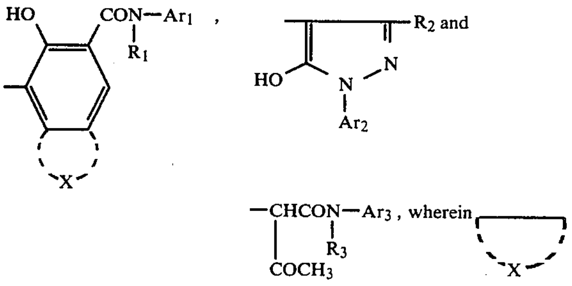

is a fused ring selected from the group consisting of benzene ring, halobenzene ring, naphthalene ring, indole ring, carbazole ring and benzofuran ring; $Ar_1$ is a member selected from the group consisting of phenyl, naphthyl, dibenzofuryl, carbazolyl, substituted phenyl, substituted naphthyl, substituted dibenzofuryl and substituted carbazolyl wherein the substituents are selected from the group consisting of halogen, $C_1$–$C_4$ alkoxy, dialkylamino wherein each alkyl has 1–4 carbon atoms, cyano, carboxyl, nitro and $SO_3Na$; each of $Ar_2$ and $Ar_3$ is a member selected from the group consisting of phenyl, naphthyl, substituted phenyl and substituted naphthyl wherein the substituents are selected from the group consisting of nitro, $SO_3NH_2$, $SO_3H$, halogen, $C_1$–$C_4$ alkyl, $C_1$–$C_{14}$ alkoxy, cyano, dialkylamino wherein each alkyl has 1–4 carbon atoms and acylamino having 1–4 carbon atoms; each of $R_1$ and $R_3$ is a member selected from the group consisting of hydrogen, alkyl having 1–4 carbon atoms, phenyl and halophenyl; and $R_2$ is a member selected from the group consisting of alkyl having 1–4 carbon atoms, carboxyl and esters thereof wherein the ester-forming group has 1–4 carbon atoms; a charge-transfer substance and a resinous binder.

18. An electrophotographic element according to claim 17 wherein the thickness of said photosensitive layer is in the range of from about 3μ to about 50μ.

19. An electrophotographic element according to claim 17 wherein the amount of said disazo compound is in the range of from about 1 wt.% to about 50 wt.% relative to the photosensitive layer and the amount of said charge transfer substance is in the range of from about 10 wt.% to about 95 wt.% relative to the photosensitive layer.

20. An electrophotographic element according to claim 17 wherein A is

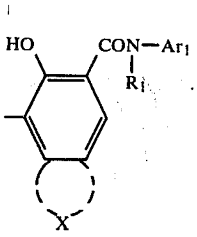

21. An electrophotographic element according to claim 17 wherein A is

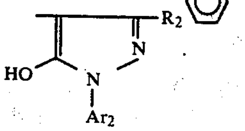

22. An electrophotographic element according to claim 17 wherein A is

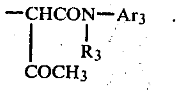

23. An electrophotographic element according to claim 17 wherein the disazo compound is

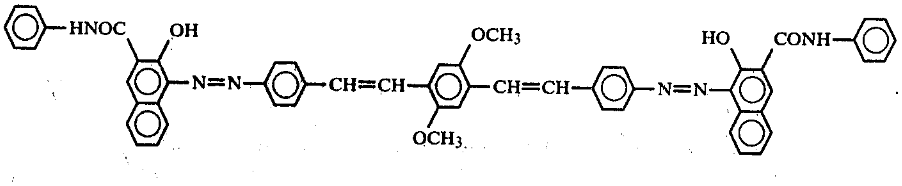

24. An electrophotographic element according to claim 17 wherein the disazo compound is

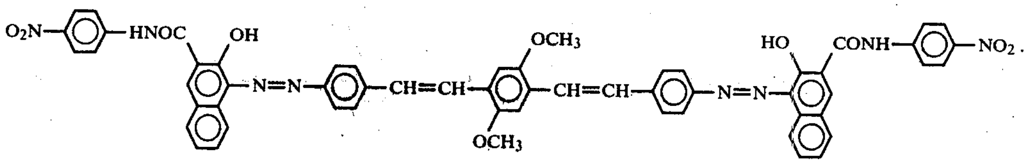

25. An electrophotographic element according to claim 17 wherein the disazo compound is

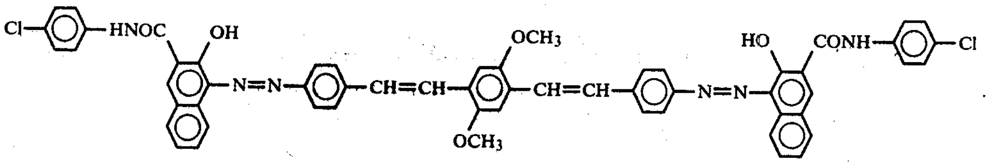

26. An electrophotographic element according to claim 17 wherein the disazo compound is

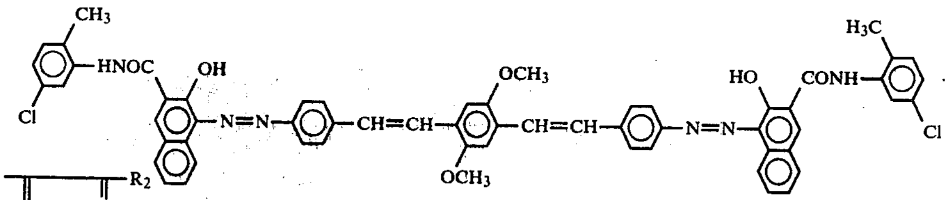

27. An electrophotographic element according to claim 17 wherein the disazo compound is

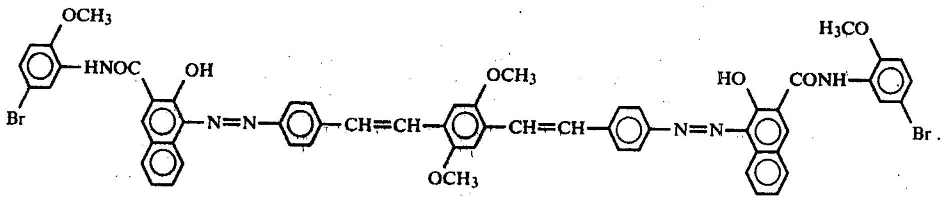

28. An electrophotographic element according to claim 17 wherein the disazo compound is

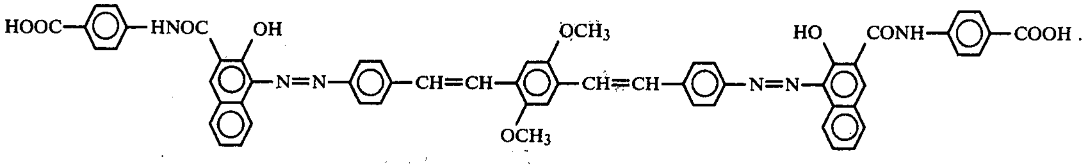

29. An electrophotographic element according to claim 17 wherein the disazo compound is 32. An electrophotographic element according to claim 17 wherein the disazo compound is

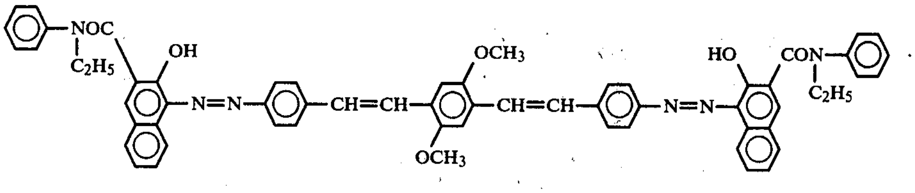

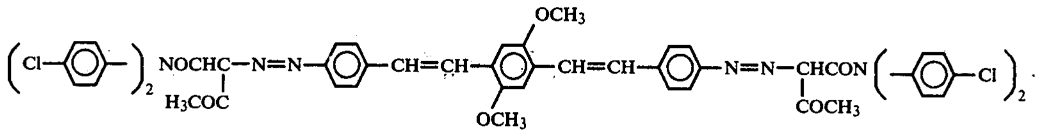

30. An electrophotographic element according to claim 17 wherein the disazo compound is 33. An electrophotographic element according to claim 17 wherein the disazo compound is

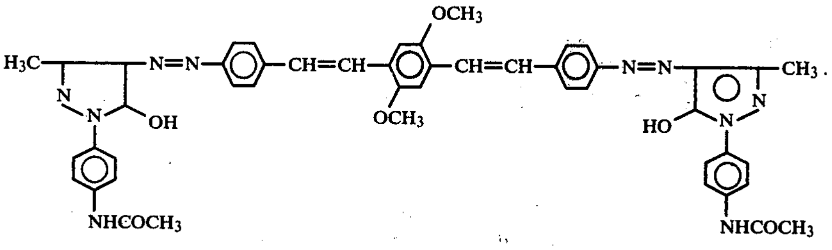

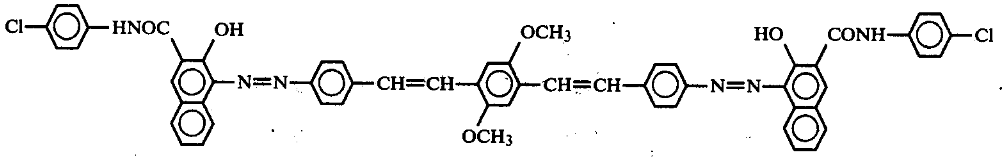

31. An electrophotographic element according to claim 17 wherein the disazo compound is 34. An electrophotographic element according to claim 17 wherein the disazo compound is

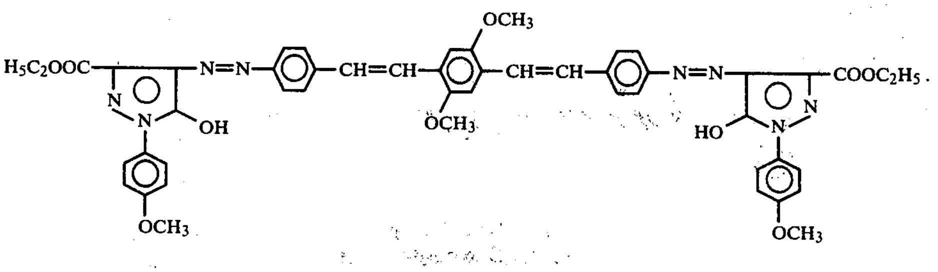

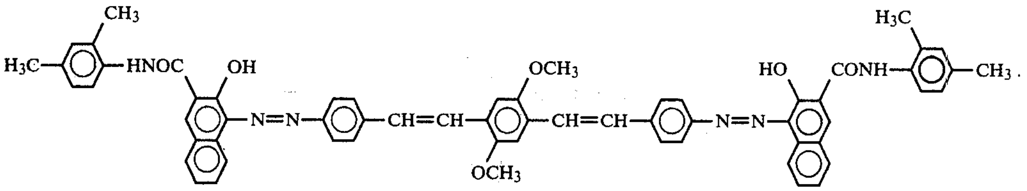

35. An electrophotographic element according to claim 17 wherein the disazo compound is

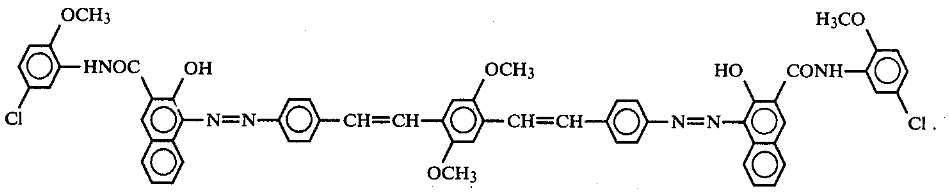

36. An electrophotographic element according to claim 17 wherein the disazo compound is

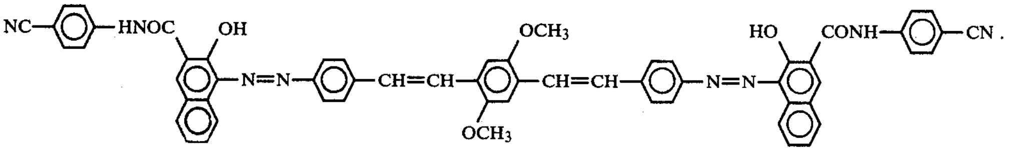

37. An electrophotographic element according to claim 17 wherein the disazo compound is

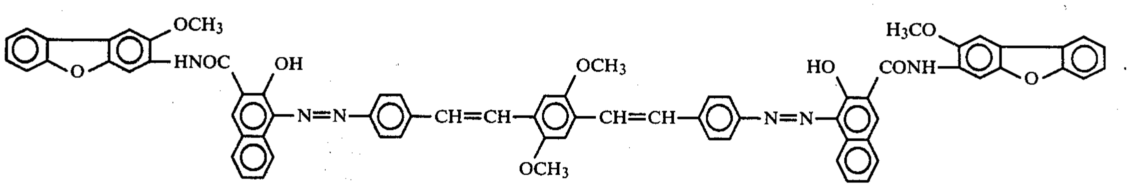

38. An electrophotographic element according to claim 17 wherein the disazo compound is

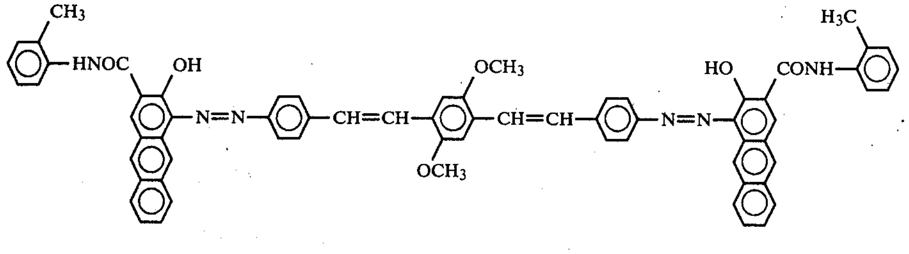

39. An electrophotographic element according to claim 17 wherein the disazo compound is

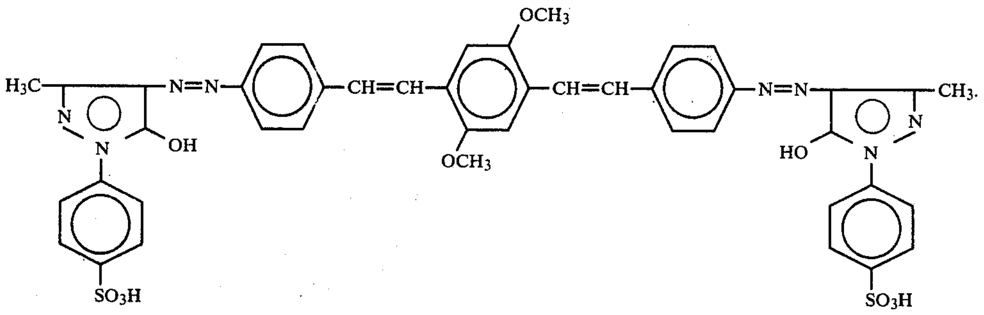

40. An electrophotographic element according to claim 17 wherein the disazo compound is

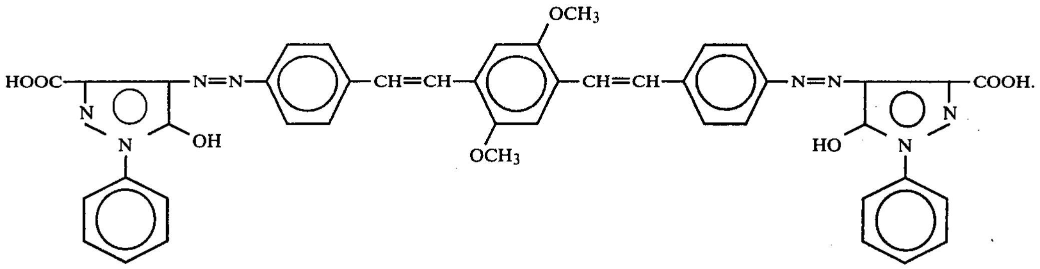

41. An electrophotographic element according to claim 17 wherein the disazo compound is 44. An electrophotographic element according to claim 17 wherein the disazo compound is

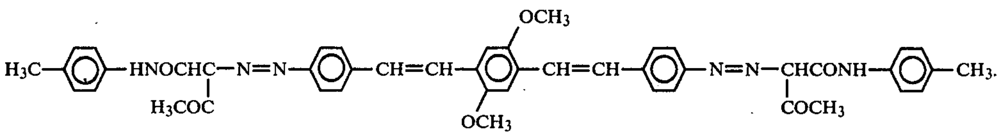

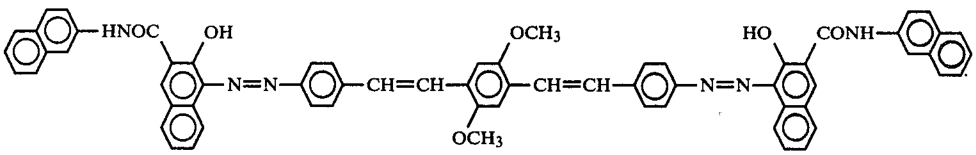

42. An electrophotographic element according to claim 17 wherein the disazo compound is 45. An electrophotographic element according to claim 17 wherein the disazo compound is

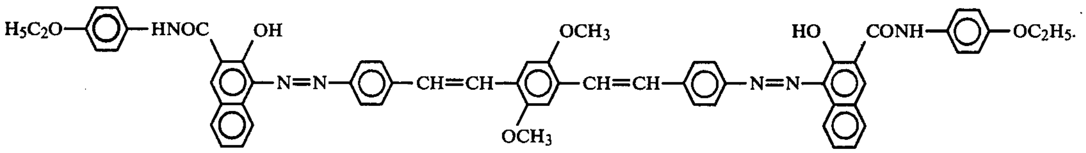

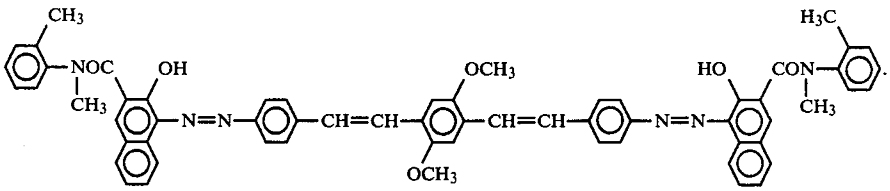

43. An electrophotographic element according to claim 17 wherein the disazo compound is 46. An electrophotographic element according to claim 17 wherein the disazo comound is

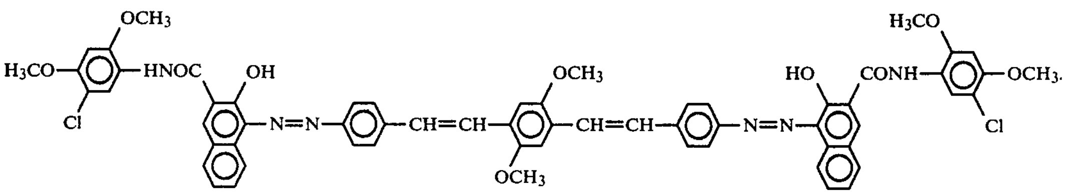

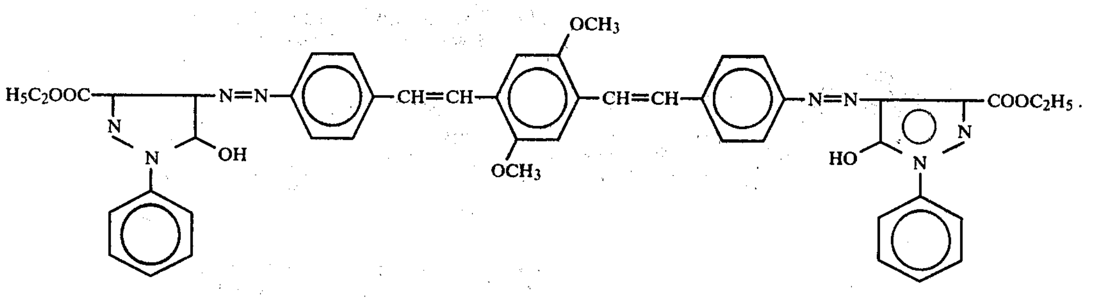

47. An electrophotographic element according to claim 17 wherein the disazo compound is

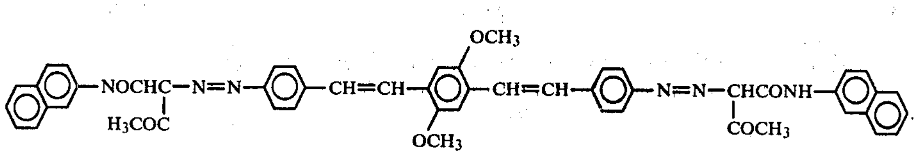

48. An electrophotographic element which comprises an electrically conductive support, a charge generating layer on said electrically conductive support, said charge generating layer consisting essentially of a disazo compound having the formula

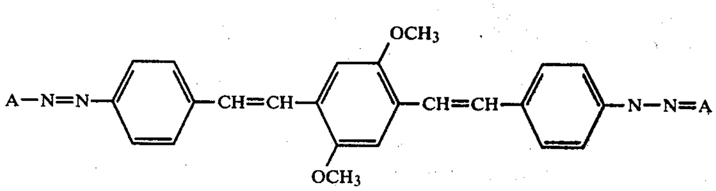

wherein A is a member selected from the group consisting of

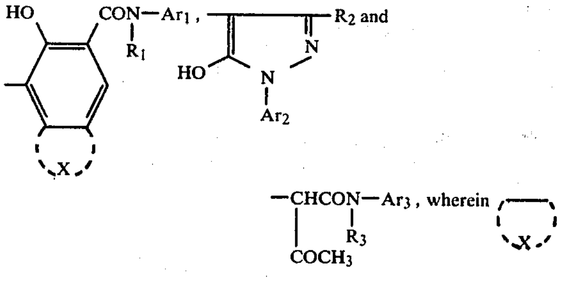

is a fused ring selected from the group consisting of benzene ring, halobenzene ring, naphthalene ring, indole ring, carbazole ring and benzofuran ring; $Ar_1$ is a member selected from the group consisting of phenyl, naphthyl, dibenzofuryl, carbazolyl, substituted phenyl, substituted naphthyl, substituted dibenzofuryl and substituted carbazolyl wherein the substituents are selected from the group consisting of halogen, $C_1$-$C_4$ alkoxy, dialkylamino wherein each alkyl has 1-4 carbon atoms, cyano, carboxyl, nitro and $SO_3Na$; each of $Ar_2$ and $Ar_3$ is a member selected from the group consisting of phenyl, naphthyl, substituted phenyl and substituted naphthyl wherein the substituents are selected from the group consisting of nitro, $SO_3NH_2$, $SO_3H$, halogen, $C_1$-$C_4$ alkyl, $C_1$-$C_4$ alkoxy, cyano, dialkylamino wherein each alkyl has 1-4 carbon atoms and acylamino having 1-4 carbon atoms; each of $R_1$ and $R_3$ is a member selected from the group consisting of hydrogen, alkyl having 1-4 carbon atoms, phenyl and halophenyl; and $R_2$ is a member selected from the group consisting of alkyl having 1-4 carbon atoms, carboxyl and esters thereof wherein the ester-forming group has 1-4 carbon atoms; and a charge transfer layer on said charge generating layer, said charge transfer layer consisting essentially of a charge transfer substance and a resinous binder.

49. An electrophotographic element according to claim 48 wherein the thickness of said charge generating layer is in the range of from about 0.01μ to about 5μ, and the thickness of said charge transfer layer is in the range of from about 3μ to about 50μ.

50. An electrophotographic element according to claim 48 wherein the thickness of said charge generating layer is in the range of from about 0.03μ to about 2μ, and the thickness of said charge transfer layer is in the range of from about 5μ to about 20μ.

51. An electrophotographic element according to claim 48 wherein the amount of said charge transfer substance is in the range of from about 10 wt.% to 95 wt.% relative to the charge transfer layer.

52. An electrophotographic element according to claim 48 wherein A is

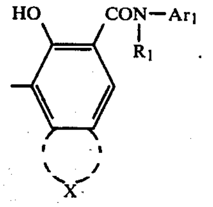

53. An electrophotographic element according to claim 48 wherein A is

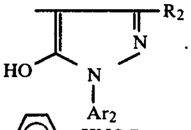

54. An electrophotographic element according to claim 48 wherein A is

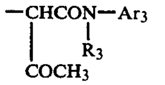

55. An electrophotographic element according to claim 48 wherein the disazo compound is

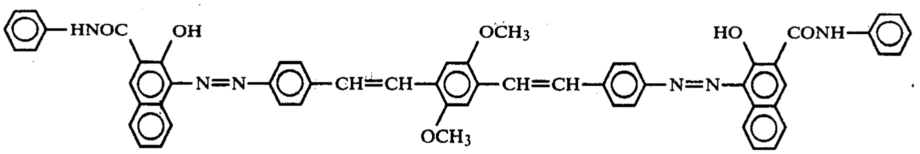

56. An electrophotographic element according to claim 48 wherein the diaza compound is

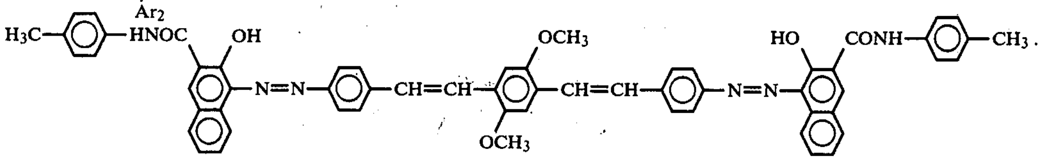

57. An electrophotographic element according to claim 48 wherein the disazo compound is

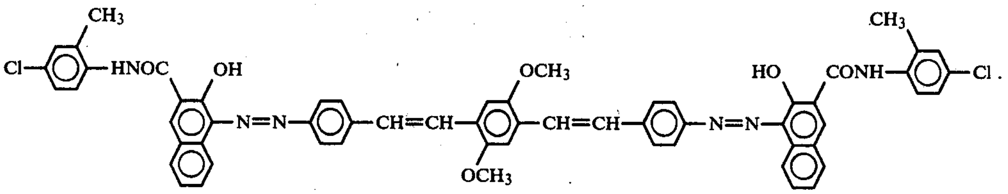

58. An electrophotographic element according to claim 48 wherein the disazo compound is

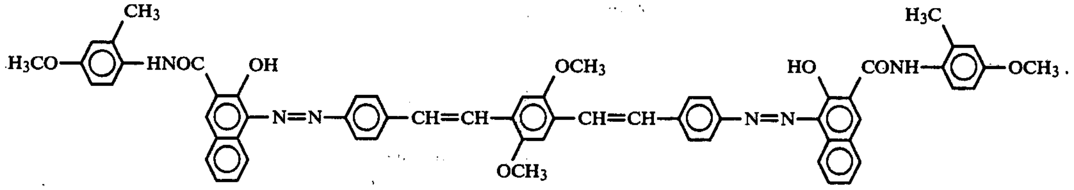

59. An electrophotographic element according to claim 48 wherein the disazo compound is

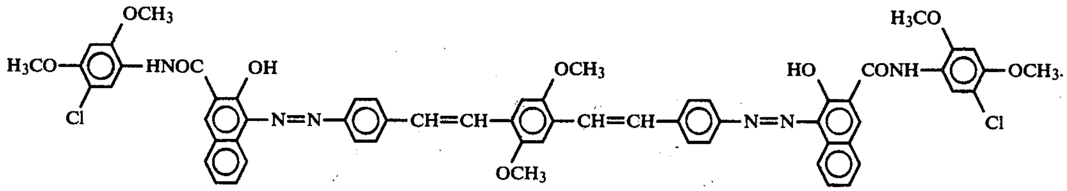

60. An electrophotographic element according to claim 48 wherein the disazo compound is

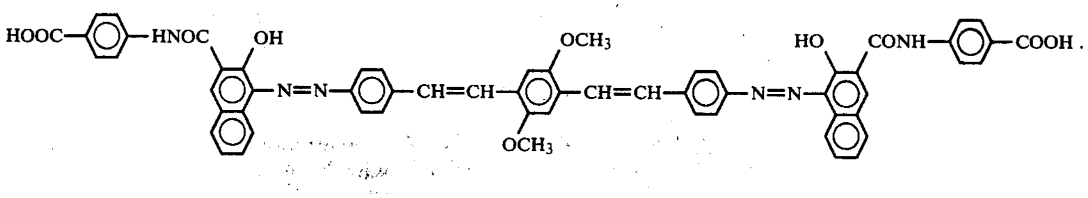

61. An electrophotographic element according to claim 48 wherein the disazo compound is

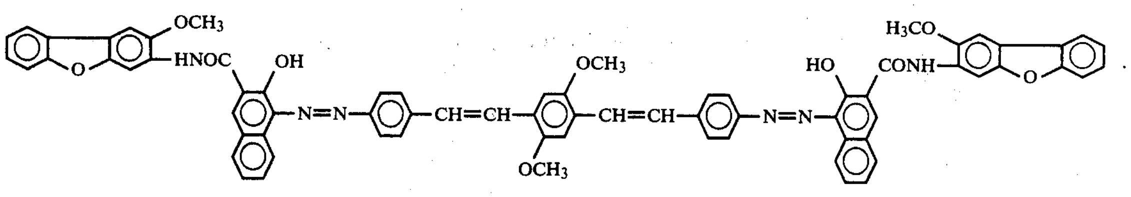

62. An electrophotographic element according to claim 48 wherein the disazo compound is

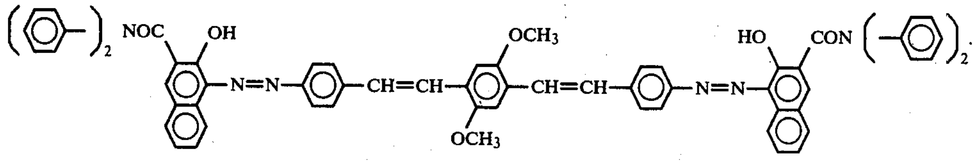

63. An electrophotographic element according to claim 48 wherein the disazo compound is

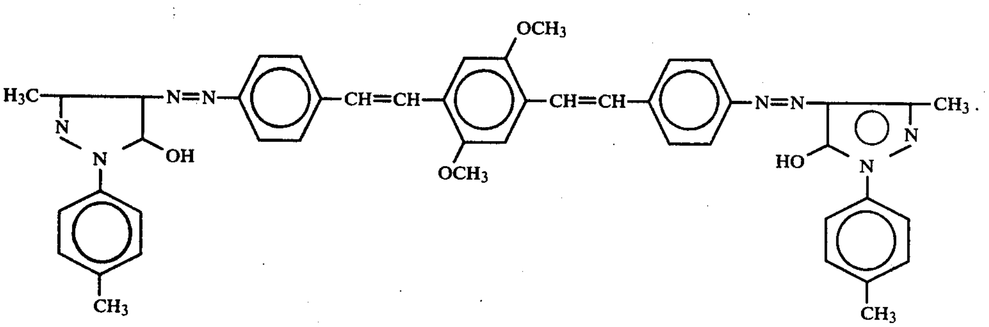

64. An electrophotographic element according to claim 48 wherein the disazo compound is

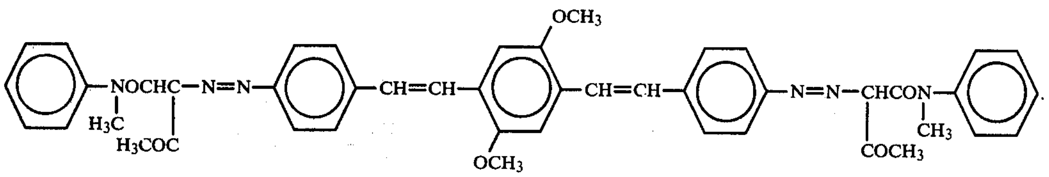

65. An electrophotographic element according to claim 48 wherein the disazo compound is

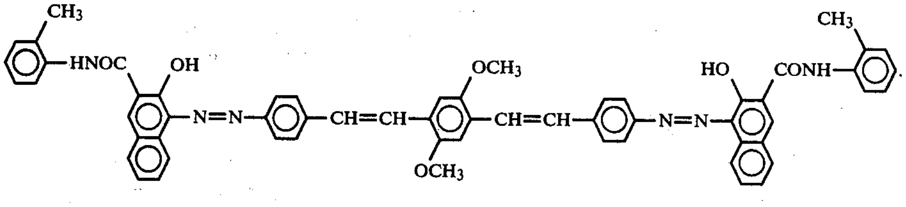

66. An electrophotographic element according to claim 48 wherein the disazo compound is

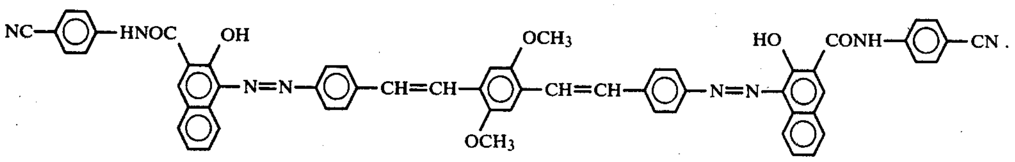

67. An electrophotographic element according to claim 48 wherein the disazo compound is

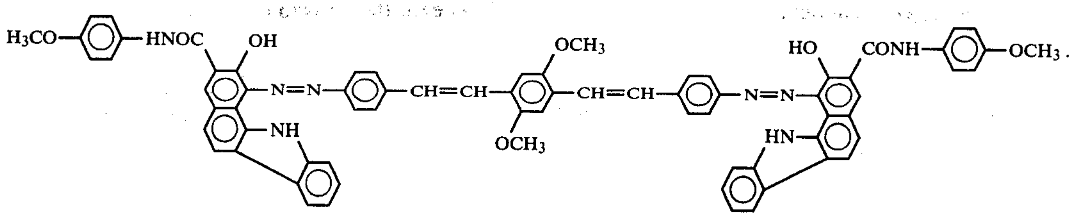
68. An electrophotographic element according to claim 48 wherein the disazo compound is
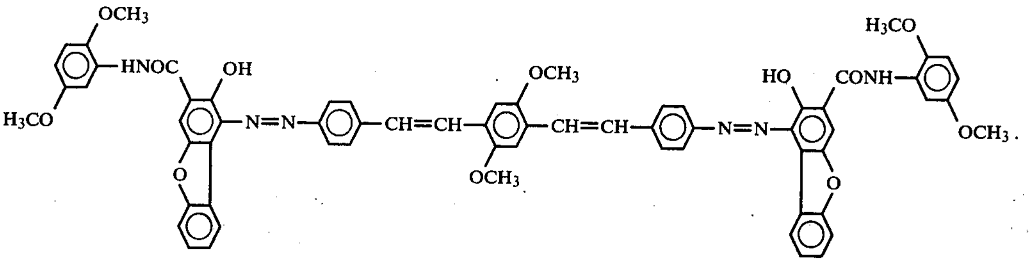
69. An electrophotographic element according to claim 48 wherein the disazo compound is
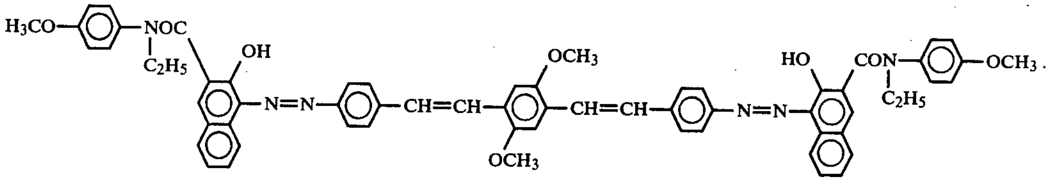
70. A electrophotographic element according to claim 48 wherein the disazo compound is
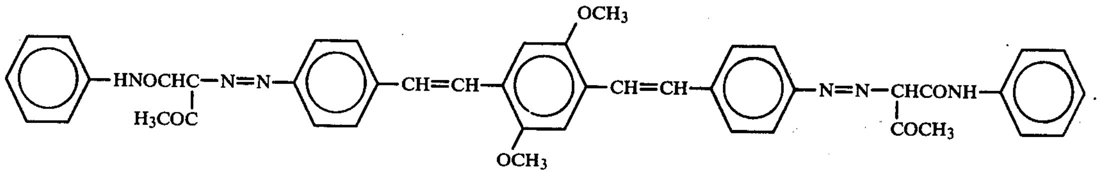
* * * * *

UNITED STATES PATENT AND TRADEMARK OFFICE
CERTIFICATE OF CORRECTION

PATENT NO. : 4 268 596 Page 1 of 3

DATED : May 19, 1981

INVENTOR(S) : Masaomi Sasaki et al

It is certified that error appears in the above—identified patent and that said Letters Patent is hereby corrected as shown below:

Column 29, Claim 11; change "An electrophotographic element according to claim 1 wherein the compound expressed by the aforesaid formula is" to ---An electrophotographic element according to claim 1 wherein the disazo compound is---.

Columns 33-34, Claim 25; change the formula to read as follows:

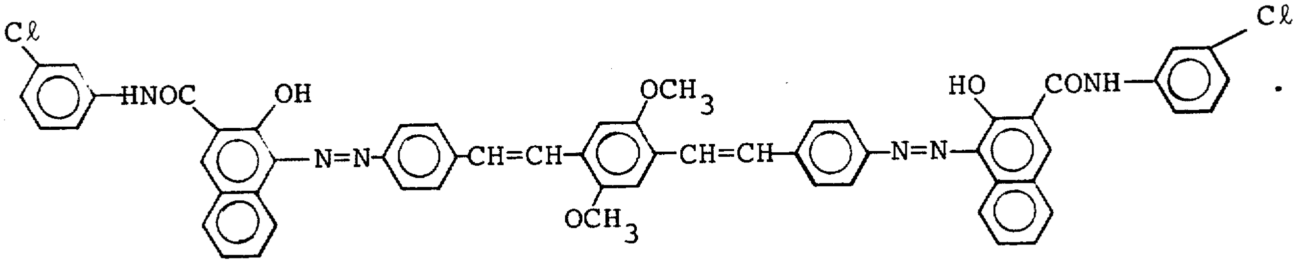

UNITED STATES PATENT AND TRADEMARK OFFICE
CERTIFICATE OF CORRECTION

PATENT NO. : 4 268 596
DATED : May 19, 1981
INVENTOR(S) : Masaomi Sasaki et al

It is certified that error appears in the above—identified patent and that said Letters Patent is hereby corrected as shown below:

Column 35, Claim 30; change the formula to read as follows:

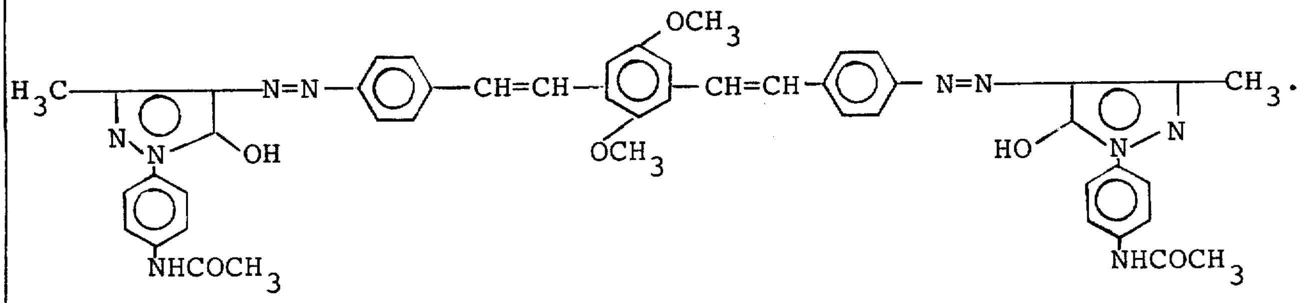

Column 41, Claim 46; change the formula to read as follows:

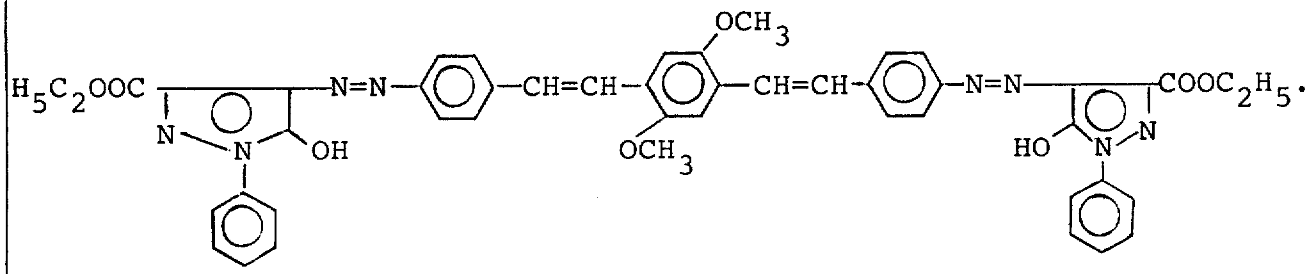

UNITED STATES PATENT AND TRADEMARK OFFICE
CERTIFICATE OF CORRECTION

PATENT NO. : 4 268 596 Page 3 of 3

DATED : May 19, 1981

INVENTOR(S) : Masaomi Sasaki et al

It is certified that error appears in the above—identified patent and that said Letters Patent is hereby corrected as shown below:

Column 41, Line 65; change "$C_1$-$C_4$ alkoxy" to ---$C_1C_{14}$ alkoxy---.

Column 44, Claim 56, Line 2; change "diaza" to ---disazo---.

Column 45, Claim 63; change the formula to read as follows:

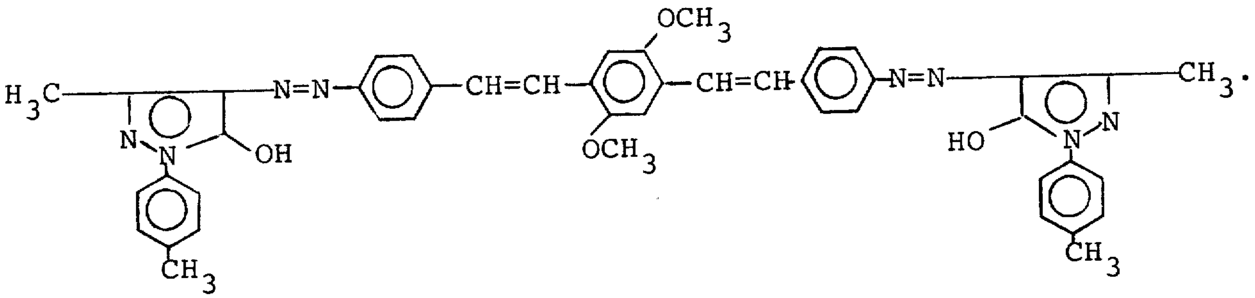

Column 48, Claim 70, Line 1 thereof; change "A" to ---An---.

Signed and Sealed this

*Twenty-second* Day of *September 1981*

[SEAL]

*Attest:*

GERALD J. MOSSINGHOFF

*Attesting Officer* *Commissioner of Patents and Trademarks*